United States Patent [19]

Rice

[11] Patent Number: 4,592,204

[45] Date of Patent: Jun. 3, 1986

[54] COMPRESSION INTERCOOLED HIGH CYCLE PRESSURE RATIO GAS GENERATOR FOR COMBINED CYCLES

[76] Inventor: Ivan G. Rice, P.O. Box 233, Spring, Tex. 77383

[21] Appl. No.: 572,548

[22] Filed: Jan. 20, 1984

Related U.S. Application Data

[60] Continuation-in-part of Ser. No. 486,334, Apr. 19, 1983, Pat. No. 4,545,187, Ser. No. 486,336, Apr. 19, 1983, Ser. No. 486,495, Apr. 19, 1983, Pat. No. 4,543,781, Ser. No. 416,171, Sep. 9, 1982, abandoned, Ser. No. 416,172, Sep. 9, 1982, abandoned, Ser. No. 416,173, Sep. 9, 1982, Ser. No. 416,275, Sep. 9, 1982, Pat. No. 4,507,914, Ser. No. 274,660, Jun. 17, 1981, Pat. No. 4,384,452, Ser. No. 224,496, Jan. 13, 1981, Pat. No. 4,438,625, and Ser. No. 47,571, Jun. 11, 1979, Pat. No. 4,314,442, said Ser. No. 486,334, Ser. No. 486,336, and Ser. No. 486,495, each is a continuation-in-part of said Ser. No. 416,171, Ser. No. 416,172, Ser. No. 416,173, Ser. No. 461,275, Ser. No. 274,660, Ser. No. 224,496, and Ser. No. 47,571, and Ser. No. 954,838, Oct. 26, 1978, Pat. No. 4,272,953, said Ser. No. 416,171, Ser. No. 416,172, Ser. No. 416,173, and Ser. No. 416,275, each is a continuation-in-part of said Ser. No. 274,660, Ser. No. 224,496, Ser. No. 47,571, and Ser. No. 954,838, said Ser. No. 274,660, is a division of said Ser. No. 47,571, said Ser. No. 224,496, is a division of said Ser. No. 954,838.

[51] Int. Cl.⁴ .......................... F02C 3/10; F02C 7/143
[52] U.S. Cl. .................. 60/39.161; 60/39.17; 60/728
[58] Field of Search .............. 60/39.04, 39.161, 39.17, 60/39.31, 39.32, 728; 415/179

[56] References Cited

U.S. PATENT DOCUMENTS

| | | | |
|---|---|---|---|
| 2,312,605 | 3/1943 | Traupel | 60/39.17 |
| 2,563,745 | 8/1951 | Price | 415/179 |
| 2,575,683 | 11/1951 | Price | 60/728 |
| 2,625,012 | 1/1953 | Larnecq | 60/39.161 |
| 2,645,412 | 7/1953 | Sens | 60/39.161 |
| 2,722,802 | 11/1955 | Blackwell et al. | 60/39.161 |
| 3,546,880 | 12/1970 | Schwaar | 60/39.161 |
| 3,823,553 | 7/1974 | Smith | 60/39.31 |
| 3,892,499 | 7/1975 | Strub | 415/179 |
| 4,030,288 | 6/1977 | Davis et al. | 60/39.31 |
| 4,206,593 | 6/1980 | Su et al. | 60/39.04 |

FOREIGN PATENT DOCUMENTS 215474 10/1941 Switzerland ....................... 415/179

Primary Examiner—Louis J. Casaregola

[57] ABSTRACT

A compression intercooled gas generator operating at high-cycle pressure ratios of 35 to 65 atmospheres to furnish hot pressurized gas sequentially to a diffuser, to a reheat combustor and then to a power turbine. An associated method of compression intercooling with an optimum intercooling pressure ratio to minimize overall combined-cycle efficiency degradation when said gas generator, diffuser, reheat combustor and power turbine are operating in conjunction with a heat-recovery boiler and a steam or vapor turbine. A coaxial shafting arrangement for driving the low-pressure and high-pressure compressor sections. A pressure-retaining casing arrangement enclosing the high-pressure portion of said gas generator to contain the higher than normal pressure of said gas generator.

21 Claims, 17 Drawing Figures

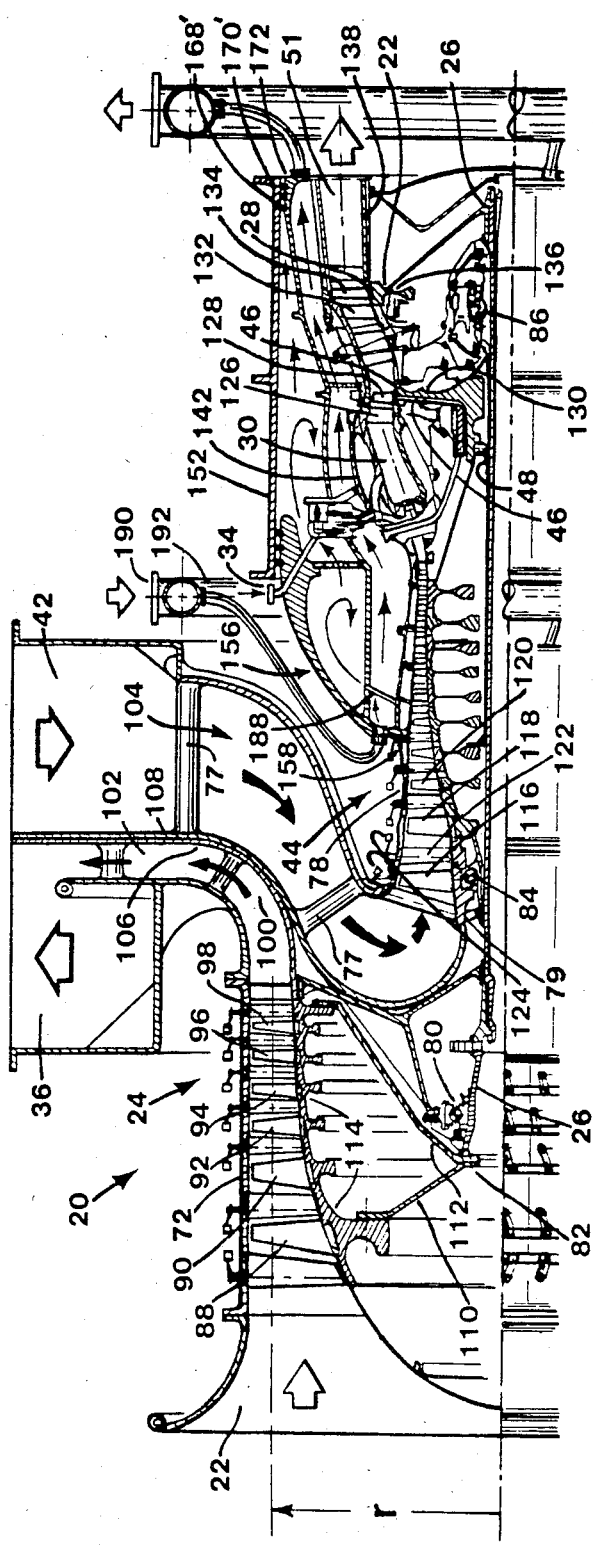
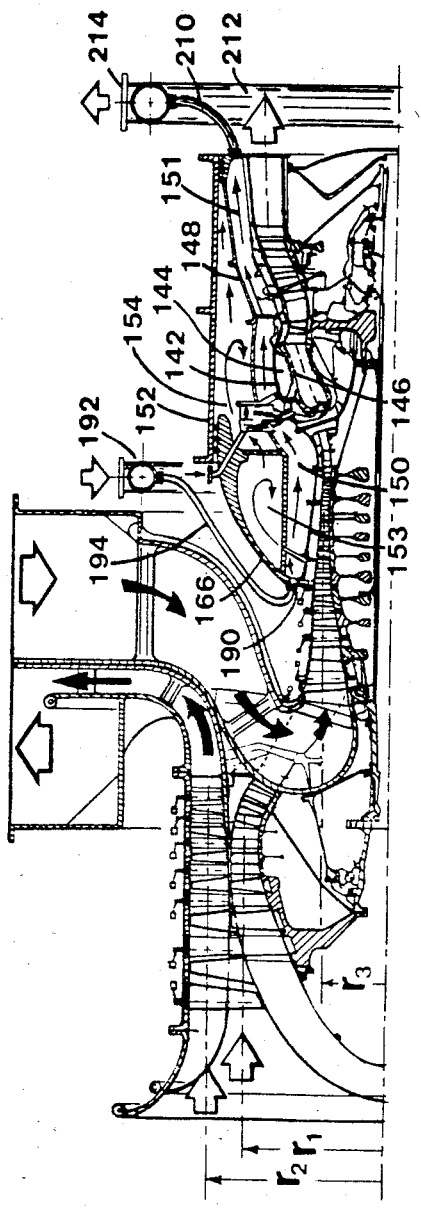
Fig. 3
Fig. 4

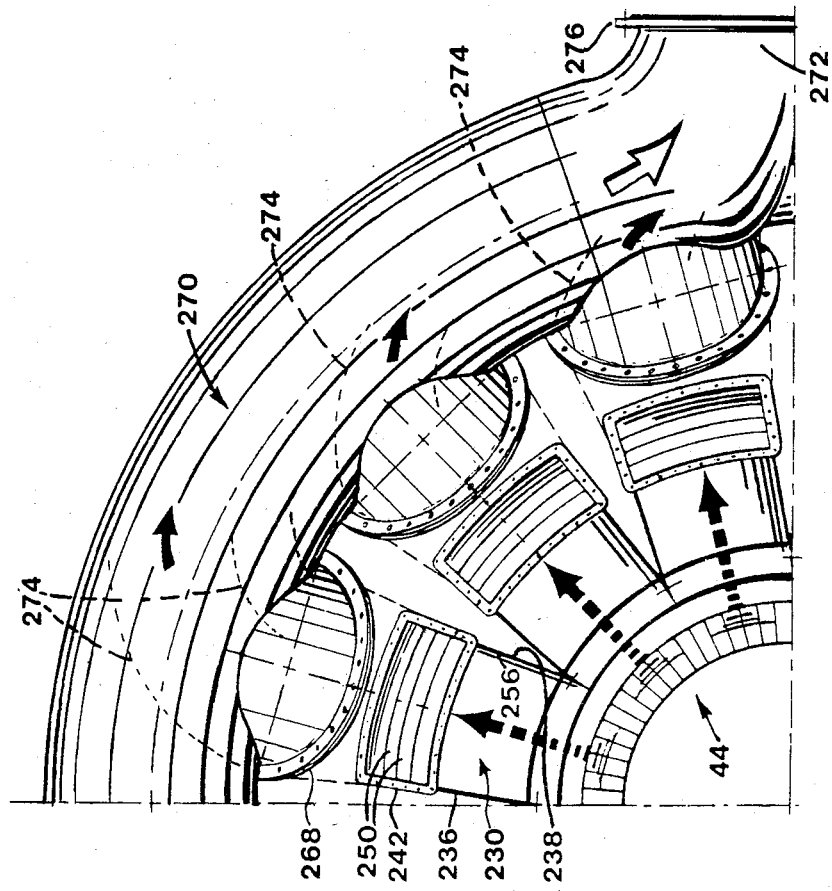
Fig. 8
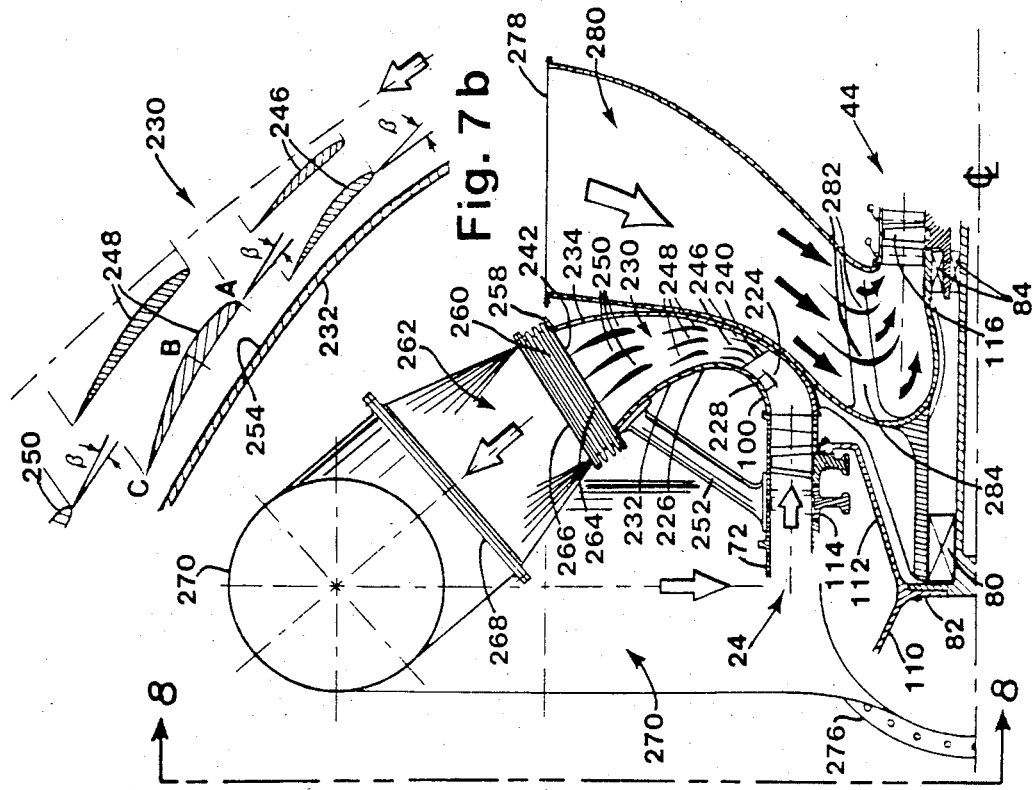
Fig. 7b
Fig. 7a

COMPRESSION INTERCOOLED HIGH CYCLE PRESSURE RATIO GAS GENERATOR FOR COMBINED CYCLES

CROSS REFERENCE TO RELATED APPLICATIONS

This application is a continuation-in-part of U.S. application Ser. No. 047,571, filed June 11, 1979, now U.S. Pat. No. 4,314,442.

This application is also a continuation-in-part of U.S. application Ser. No. 224,496, filed Jan. 13, 1981 (U.S. Pat. No. 4,438,625) which is a division of U.S. application Ser. No. 954,838 filed Oct. 26, 1978, now U.S. Pat. No. 4,272,953.

This application is also a continuation-in-part of U.S. application Ser. No. 274,660, filed June 17, 1981, now U.S. Pat. No. 4,384,452, which is a division of U.S. application Ser. No. 047,571, filed June 11, 1979, now U.S. Pat. No. 4,314,442.

This application is also a continuation-in-part of the four U.S. application Ser. Nos. 416,171 (abandoned); 416,172 (abandoned); 416,173 (allowed) and 416,275 (U.S. Pat. No. 4,507,914), filed Sept. 9, 1982, with each of these being a continuation-in-part of the heretofore Above stated U.S. applications and U.S. patents.

This application is likewise a continuation-in-part of the three U.S. application Ser. Nos. 486,334 (U.S. Pat. No. 4,545,187); 486,336 (allowed) and 486,495 (U.S. Pat. No. 4,543,781), filed Apr. 19, 1983, with each of these U.S. applications and U.S. patents.

BACKGROUND OF THE INVENTION

This invention relates to an open-cycle compression-intercooled gas generator operating at high cycle pressure ratios of 35 to 65 atmospheres. The said gas generator exhausts hot gas at relatively high velocity and pressure to a diffuser where a majority of the velocity pressure is converted to static pressure. The converted gas then is reheated in a reheat combustor before being expanded through a power turbine to produce mechanical work, generally considered to be electrical power.

The air is intercooled at a particular and specific pressure to minimize the overall combined cycle efficiency degradation when said gas generator, diffuser, reheat combustor and power turbine are operating in conjunction with a heat recovery boiler and a steam or vapor turbine. The boiler can evaporate water, ammonia, freon or some other liquid or a mixture thereof to form superheated vapor for expansion through a vapor turbine such as a steam turbine. A combined cycle is accordingly formed whereby the overall combined cycle efficiency can range from 50 to 65% (LHV) depending upon the gas generator and power turbine inlet temperatures and the bottoming steam or vapor cycle selected.

An integral single-bodied gas generator with a coaxial shafting arrangement for driving the low pressure and high-pressure compressor sections with intercooling connections is made possible whereby gas generators such as the GE LM5000, RR RB211, P&WA JT9 and subsequent third-generation gas generators expected to be developed from the NASA $E^3$ (Energy Efficient Engine) aircraft gas turbine program can be applied through proper modifications. The advantage of quick installation and removal of aeroderivative gas generators can be retained.

A pressure retaining casing arrangement around the high pressure portion of said gas generator, that is the high pressure compressor, the combustor and the turbine section, is provided to contain the higher than normal pressure of said gas generator. The GE LM5000 operates at a cycle pressure ratio of about 30 and the new engines to be derived from the $E^3$ program will operate at pressure ratios of about 38 atmospheres. The gas generator of this invention would operate at pressures of 35 to 65 atmospheres, but preferably at about 50. The pressure-retaining casing makes it possible to adapt light-weight aeroderivative gas generators with light-weight casings for the higher pressure levels of this invention without exceeding safe blow-out casing pressures.

The reheat-gas-turbine combined cycle is being seriously considered as a way to obtain a higher combined-cycle efficiency than otherwise obtainable from the simple-cycle gas turbine. The Japanese Government is well along in testing its 122 MW compression-intercooled reheat gas turbine and field-test results will be made available in mid-1984.

The Japanese reheat-gas-turbine configuration incorporates compression intercooling to accomplish a projected 55 percent (LHV) combined-cycle efficiency. Intercooling is done at about a 4.85 ratio by direct-contact condensate spray water. The intercooling of my invention takes place at a much lower and specific pressure with an optimum ratio range of about 2.0 to 2.5 and uses condensate and cooling-tower, lake, river or sea water as the coolant in a primary closed loop and an open or closed secondary loop. Ammonia or a mixture of ammonia and water can also be used as the intercooler coolant where a dry-type atmospheric cooling system is employed. Direct-contact water-spray cooling can also be used.

Studies of the non-intercooled reheat-gas-turbine combined cycle show that such an arrangement will produce the highest combined-cycle efficiency for any given gas generator and reheat-turbine inlet temperatures. However, the non-intercooled gas generator is limited to about 40 atmospheres primarily due to the high compressor discharge temperatures associated with the high compressor pressure. My invention makes it possible to exceed the 40 atmospheres and provide a lower compressor-discharge temperature needed for said gas generator combustor-liner cooling and $NO_x$ control.

Industrializing the $E^3$ engine gas generators, considered to be the third generation of aircraft engines, is inevitable based on past history, and adapting them for intercooling can be accomplished using the basic engine designs coming from the $E^3$ program and applying the process principles and design features of this invention. Adaptation of the $E^3$ engine such as the Pratt and Whitney Aircarft 2037 and 4000 series engines as well as similar engines by General Electric and Rolls Royce being readied for aircraft service can be applied.

In U.S. Pat. No. 4,272,953 applicant has disclosed that second generation, high-cycle pressure ratio, high-firing temperature gas generators can be used in the reheat gas turbine/steam turbine combined cycle to yield increased efficiency and output heretofore unexpected from reheat-gas-turbine combined cycles. A novel reheat gas turbine without intercooling combined with a steam turbine is further disclosed in applicant's pending application, U.S. Ser. No. 224,496 filed Jan. 13, 1981. In this pending application the reheat gas turbine comprises a juxtaposed and axially aligned gas generator and power turbine in which gas flow through the gas generator, reheat combustor and power turbine is substantially linear throughout, but nothing is given on the compression intercooling in either disclosure.

Other U.S. patents and pending applications by the applicant, all pertaining to the reheat gas turbine and steam cooling, but not specifically to compression intercooling are as follows:

U.S. Pat. No. 4,314,442
U.S. Pat. No. 4,384,452
U.S. Ser. No. 416,171
U.S. Ser. No. 416,172
U.S. Ser. No. 416,173
U.S. Ser. No. 416,275
U.S. Ser. No. 486,334
U.S. Ser. No. 486,336
U.S. Ser. No. 486,495.

Intercooling has been used for many years with compression of air and other gaseous fluids to reduce the power required for compression. Also simple-cycle and reheat-cycle gas turbines have incorporated air compression intercooling to reduce compression work and consequently to increase the gas turbine output, particularly for regenerative-cycle gas turbines not involving a combined cycle. However, in such cases the emphasis has been on maximizing output and gas turbine efficiency and not to optimize combined cycle efficiency. As will be shown, the compression intercooling in past gas turbines takes place at a much higher pressure ratio than the analytical discovery of my invention indicates as being optimum for combined cycle efficiency. The Japanese Government is developing an intercooled reheat gas turbine for combined cycle service, but water-spray intercooling is employed at a much higher intercooled compression ratio than that of my invention.

A coaxial shafting arrangement is contemplated whereby the initial (low pressure) compressor is driven by a turbine by means of a shaft running through the high-pressure compressor, the high-pressure turbine and the interconnecting shaft. Coaxial drives are highly developed for high-bypass fan jets and indeed gas generators such as General Electric's LM5000, General Motors 570K and Rolls-Royce's RB-211. However, no intercooling is used or even remotely suggested. It is the increase in the low-pressure compressor diameter made possible by the intercooling that permits adequate physical space for the air to be exited and readmitted efficiently with a minimum of pressure loss.

Further, when such type generators as the LM5000 or 570K or future third-generation aeroderivatives are modified for intercooling, the high-pressure sections (high-pressure compressor housing, combustor housing and high-pressure turbine housing) are subjected to much higher internal pressures. The cycle pressure ratios will increase from 18, 30 or 38, as the case may be, to some 35 to 65 due to the supercharging. In order for such gas generators to be adapted for compression intercooling and the higher cycle pressure ratios suitable for the reheat gas turbine and the combined cycle something has to be done about the added pressure to prevent casing rupture and/or distortion due to the higher internal pressure. This invention deals with the added pressure and the prevention of distortion and blow-out by incorporating a special and unique cylindrical pressure chamber with thermal expansion joints around the gas generator. Air is presently being used to cool the advanced aero gas-turbine casings to control rotating blade-tip clearance. This invention uses steam inside the pressure chamber not only to provide casing cooling but to also provide cooling for the internal gas-generator parts.

SUMMARY OF THE INVENTION

This invention contemplates a process and apparatus for generating a high-pressure, high-temperature gas to be reheated and expanded in a power turbine whereby useful mechanical work is produced. Additional power is also produced by a steam or vapor turbine operating in a combined cycle mode using the heat from the gas-turbine exhaust to generate the steam or vapor.

The process comprises the compression of air in a low-pressure compressor at a specified pressure ratio, intercooling said air by heat exchange or direct contact and then compressing said air to a higher than normal pressure whereafter said compressed air is heated directly by fuel and partially expanded in a gas generator arrangement. The gas-generator exit gas is further reheated by fuel and further expanded through a power turbine to produce mechanical work before being exhausted to a heat recovery boiler. Steam or vapor generated in said heat recovery boiler drives a steam or vapor turbine to produce secondary mechanical work.

Accordingly, it is an object of this invention to provide an intercooled gas generator of a higher than normal cycle pressure ratio of 35 to 65 atmospheres, preferably about 50, with a coaxial shafting arrangement as an integral modular unit for easy installation and removal with respect to the intercooler(s), gas-generator exit diffuser, reheat combustor and power turbine.

A further object is to provide a gas generator with a preferred cycle pressure ratio of about 50 atmospheres for a gas-generator firing temperature of up to 2600° F. or even higher.

A further object of this invention is to provide an intercooled gas generator with a much larger than normal low-pressure compressor pitch-line diameter to allow adequate space for an exit elbow and radial diffuser and an associated low-pressure-drop return ducting to the high-pressure compressor of said gas-generator module.

Still another object of the invention is to provide a cylindrical-pressure container arrangement around the high-pressure section of the gas-generator module to allow steam pressure and/or bleed air pressure to pressurize the outer gas-generator casing thus allowing light-weight aero-derivative type gas generators to be adapted for much higher than normal pressure ratios without danger of pressure rupture or casing distortion. Thermal expansion joints are provided in the pressure container to compensate for differential thermal expansion.

A further object of the invention is to provide an annular plenum around the high-pressure section of said gas-generator module whereby cooling steam can be admitted to the interior of said gas generator to cool the stationary parts and nozzle vanes and rotating disks and blades whereby multiple separate inlet headers and connectors are eliminated.

Still another object of this invention is to provide a process for intercooling the air at the proper pressure ratio to optimize combined-cycle efficiency and minimize combined-cycle efficiency degradation. Heat exchange or direct-contact water-spray cooling is contemplated.

A further object of the invention is to provide a low-pressure-compressor cascade-airfoil diffuser and an associated process to recover additional dynamic pressure otherwise lost to the cycle. An incrementally higher combined-cycle efficiency is obtained.

Another further object of the invention is to provide gas-generator outer-casing cooling to control thermal growth of the casing and to control rotating blade-tip clearance.

Also contemplated within the scope of the invention is a combined intercooled reheat gas turbine and steam or vapor turbine cycle for production of useful power wherein superheated steam or vapor is produced by heat exchange in either the power-turbine exhaust-duct section or the reheat combustor wherein said superheated steam or vapor drives a steam or vapor power turbine for production of additional useful power to that of the power produced by the reheat gas power turbine. The steam or vapor can optionally be extracted, reheated and readmitted to the steam or vapor turbine and normally condensed for higher cycle efficiency and increased incremental power output.

These objects together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged top plan view in partial section of FIG. 2 showing more details.

FIG. 4 is a top plan view in partial section showing increase in the low-pressure compressor pitch-line radius resulting from intercooling.

FIG. 7a is a plan quarter top sectional view showing an airfoil diffuser and toroidal-shaped outlet duct.

FIG. 7b is an enlarged sectional view of the diffuser cascade airfoils of FIG. 7a.

FIG. 8 is a front quarter top sectional view of FIG. 7a viewed in direction of axial air flow.

DESCRIPTION OF THE PREFERRED EMBODIMENTS

Figure 1:
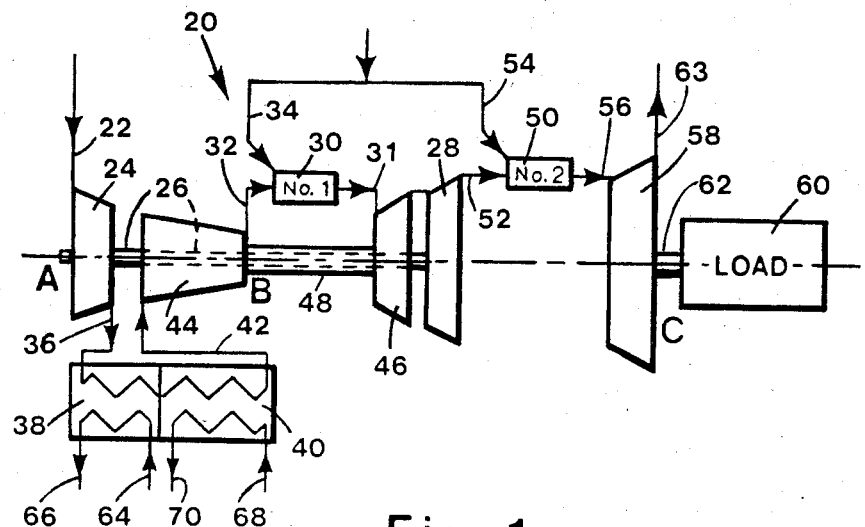
FIG. 1 is a schematic view of a compression intercooled gas generator exhausting through a diffuser to a reheat combustor and then to a power turbine to drive a mechanical or electrical load.

In FIG. 1 a schematic diagram of the intercooled gas generator of the present invention shows gas generator 20 which receives air through inlet line 22 producing compressed air by low-pressure compressor 24 which is driven through A shaft 26 by low-pressure gas-generator turbine 28 which is powered by heated gas produced in first combustor 30 from air entering combustor 30 through line 32 and fuel entering combustor 30 through fuel line 34. Low-pressure air is discharged through line 36 and is cooled by series intercoolers 38 and 40 before being discharged through line 42 to the high-pressure compressor 44. The air is further compressed by high-pressure compressor 44 driven by high-pressure turbine 46 through B shaft 48. High-pressure turbine 46 is powered by said heated gas produced in the first combustor 30. Reheat or second combustor 50 receives exhaust from gas-generator turbine 28 through reheat diffuser 52 and fuel through line 54 and dishcarges reheated gas through line 56 to power turbine 58 which drives load 60, preferably an electric generator, directly by C shaft 62. The gas exits power turbine 58 through line 63 to a heat-recovery boiler, not shown, where steam or a vapor such as freon or a mixture of water and ammonia is produced to drive a second steam or vapor turbine, not shown, forming what is commonly referred to in the industry as a combined cycle.

Low-pressure compressor 24 discharge air can be cooled first by combined-cycle steam or vapor condensate in a counterflow direction with the coolant entering intercooler 38 through line 64 and discharging through line 66. The air can be further cooled by cooling-tower, lake, river or sea water or a coolant from a dry-cooling system with the coolant counterflowing and entering second series intercooler 40 through line 68 and discharging through line 70. Direct-contact water-spray cooling can also be applied.

It is to be particularly noted that the component parts of coaxial-shaft gas generator 20 shown in FIG. 1 are conventional and only the particular physical modular arrangement and method of getting the partially compressed air out of and back into said coaxial shafted-modular gas-generator compressor 24 and 44 at a specific low-pressure range and the physical arrangement and method of controlling blow-out pressure and the introduction of coolant to said modular gas-generator internal and external parts as well as the interrelated process involved with the combined cycle leading to advantages and efficiencies disclosed in the present invention are intended to be described as new.

Fuel for combustors 30 and 50 can be liquid such as petroleum distillates, crude oil, Bunker "C" or petroleum liquid products such as methanol, or said fuel can be gaseous such as natural gas or gas produced from coal (low, medium or high BTU) and said fuel can be burned in conjunction with an integrated coal gasification combined gas turbine/steam turbine power plant.

Figure 2:
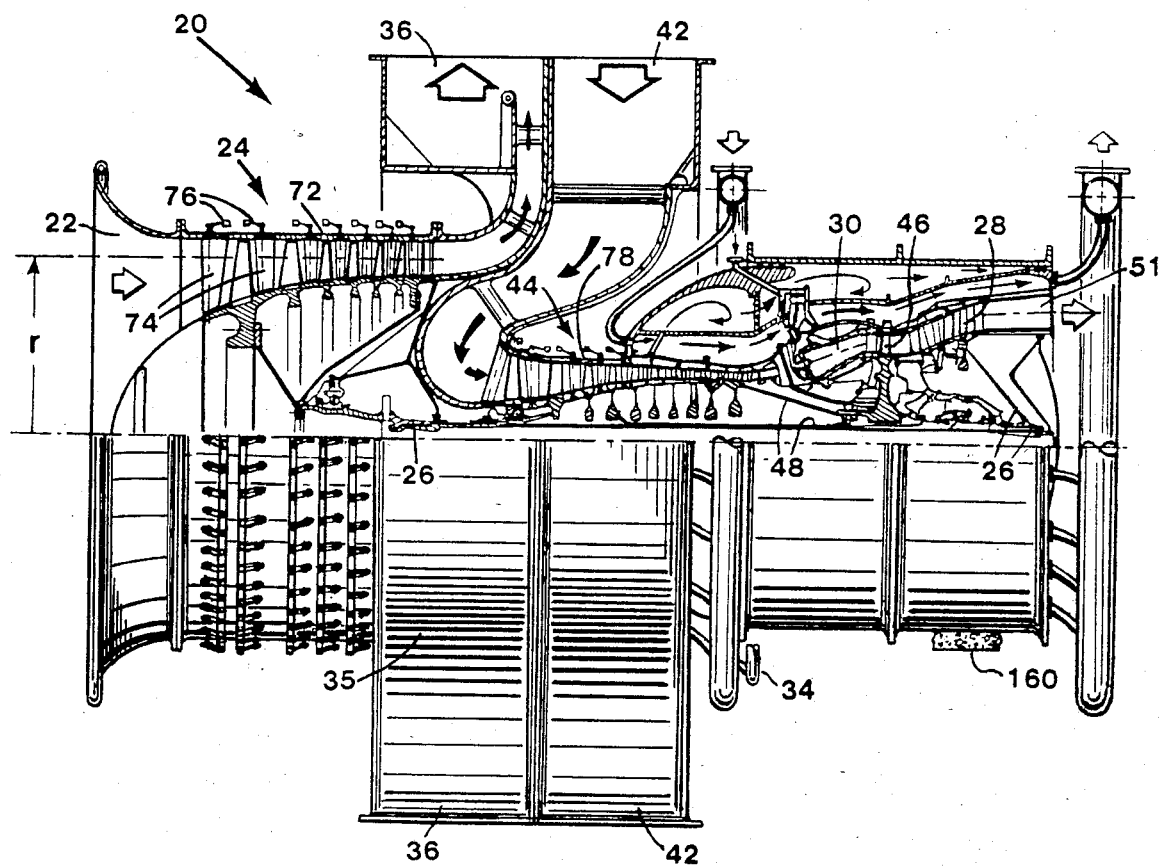
FIG. 2 is a top plan view, partially in diagramatic section, of the intercooled gas generator of the present invention illustrating the intercooling exit and re-entrance arrangement.

FIGS. 2 and 3 are overall representations of the typical modular gas generator 20 showing inlet line 22, low-pressure compressor 24 and associated outer casing 72, variable stator blades 74, variable-stator-blade linkeage mechanism 76, discharge duct 36, return duct 42, high-pressure compressor 44, associated outer casing 78, combustor 30, high-pressure turbine 46, low-pressure turbine 28, coaxial shafting 26 and 48 and exit 51 to diffuser 52.

There can be two discharge ducts 36, one on each side of gas generator 20 and two return ducts 42, one on each side of gas generator 20 to feed two mirror-image twin intercoolers 38 and 40 located on each side of gas generator 20. The dual ducting and intercooler arrangement makes it possible to manage the flow of the low-density high-volume air to and from the intercooler(s) more efficiently with a lower overall pressure loss.

Referring to FIG. 3, an enlarged partial view of FIG. 2, the low-pressure compressor 24 is supported by forward antifriction steel ball bearing 80 and is cantilevered or overhung. Said compressor rotor drum 114 is mounted to shaft 26 by flange 82. The high-pressure compressor 44 is supported by duplex antifriction bearing(s) 84 for coaxial shafts 26 and 48. The high-pressure turbine 46 and low-pressure turbine 28 are supported by rear duplex antifriction bearing(s) 86. The low-pressure shaft 26 and compressor 24, components for a gas generator with an airflow of 300 lb/sec, would typically rotate at about 3600 RPM and the high-pressure shaft 48 and compressor 44 would typically rotate at about 8500 RPM. Note that hydrodynamic-type bearings (usually babbit) can be applied for industrial-type construction.

FIG. 3 is an enlarged view of FIG. 2 representative of the typical high-cycle pressure-ratio intercooled gas generator 20 of the present invention including low-pressure compressor 24, high-pressure compressor 44, low-pressure turbine 28, high-pressure turbine 46, coaxial shafting A and B (26 and 48), outlet ducting 36, return inlet ducting 42 and exit 51 to diffuser 52. Gas-generator low-pressure compressor 24 is made up of stages 88, 90, 92, 94, 96, 98 of a six-stage axial-flow compressor. There can be fewer stages or more stages as required to produce the desired pressure ratio, and for a typical pressure ratio of 2.5 there would be four to six stages according to the particular design and manufacturer.

Low-pressure compressor 24 discharges axially at about Mach 0.3 air velocity corresponding to about 400 to 450 ft/sec at the flowing temperature. Said air flows into elbow 100 where the airflow direction is changed from that of axial to radial. The air flow at this point is then diffused by flat or parallel wall vaneless diffuser 102 before being discharged to a scroll collector 35 and then to duct 36. The gas velocity exiting diffuser 102 is at about Mach 0.14 corresponding to about 200 ft/sec according to the gas temperature involved. About 65 to 70 percent of the velocity pressure head is recovered by diffuser 102 and the remainder is dissipated and lost to the cycle. The cooled air enters the high-pressure compressor 44 through a separate duct 42 by means of a special "S" shaped inlet duct 104 detachably attached to compressor outer casing 78, inner housing 79 and elbow 100. Struts 77 joins together forward and aft sides of inlet duct 104. The cooled air counterflows in direction to that of the hot discharge air flowing inside diffuser 102. Diffuser 102 and elbow 100 fit adjacent and close to the outer wall 108 of inlet duct 104 and are removably secured together. Generous cross-sectional area of the inlet duct 104 is provided to keep the inlet air velocity low at a value of approximately 50 to 75 ft/sec to reduce inlet pressure loss.

The added low-pressure compressor 24 pitch-line radius, r, FIG. 2, made possible by the cooler and more dense air to the high-pressure compressor 44 provides the needed radial space and therefore makes it possible to exit the low-pressure compressor 24 hot air, diffuse the hot air and return the cooled air to the high pressure compressor 44 efficiently and with low-pressure loss and at the same time retain the coaxial shafting and unitized single-unit modular construction of gas generator 20. It is obvious that if the pitch-line radius, r, of the low-pressure compressor 24 were the same or very nearly the same as the pitch-line radius of the high-pressure compressor 44, there would not be adequate radial space without the shafting 26 to the low-pressure compressor being lengthened considerably making it impractical from a structural standpoint to adapt an aero-derivitating gas generator to a unitized single module and structural design with the given bearing arrangement provided.

Reference is made to FIG. 4 which shows the low-pressure compressor 24 of this invention with radius $r_2$ superimposed over the low-pressure compressor or a normal gas generator with radius $r_1$. Also note the smaller pitch-line radius, $r_3$, of the high-pressure compressor 44. As previously mentioned, the greater low-pressure compressor 24 radius is made possible by the change in density of the air when it is intercooled. The forward-bearing arrangement is basically the same for both cases and the stationary structural support to the bearing needs only minor changes to accomodate the inlet "S" shaped duct 104 wherein the duct 104 becomes part of the stationary structural part of said modular gas generator 20. The low-pressure compressor support funnel-shaped rotating members 110 and 112 likewise change only slightly in shape to accomodate the inlet duct 104 and low-pressure-compressor rotor drum 114. Note that the low-pressure compressor drum 114 is mounted to shaft 26 similar to how a dual truck tire and rim are cantilevered and bolted to an axle shaft which protrudes beyond the wheel-axle bearing.

The thermodynamic explanation of the increase in radius, r, will be discussed as follows: The high-pressure compressor 44 running at a constant RPM has an inlet volume flow that remains practically constant, if not constant, for varying conditions of inlet pressure and temperature, that is changes in its inlet density. The air that is compressed by the low-pressure compressor 24 is cooled before it is admitted to the inlet of the high-pressure compressor 44 and as a result the density is increased according to Boyles Law given as follows:

$$PV = WRT \tag{1}$$

where P is the absolute pressure, V is the volume, W is the weight flow, R is the gas constant and T is the absolute temperature.

As an example, if the low-pressure compressor 24 discharge air is cooled from 300° F. to 80° F. then the change in density, according to formula (1) would be 41 percent. The low-pressure compressor 24 would have to compress 41 percent greater mass of air to satisfy the high-pressure compressor 44 inlet volume. Considering no increase in low-pressure compressor 24 RPM then the pitch-line radius, $r_1$, of a normal low-pressure compressor would increase by about 19 percent to $r_2$ (square root of 1.41) See FIG. 4. Dynamic similarity principles apply.

There is another significant difference which can increase the low-pressure compressor 24 pitch-line radius, r, even further. As another example, in the case of the GE LM5000 gas generator converted to intercooling, the front low-pressure compressor would normally have a 1.667 pressure ratio and a 152° F. discharge temperature to the high-pressure compressor 44 for a 59° F. inlet temperature. The high-pressure compressor 44 has an 18 pressure ratio and discharges at 30 atmospheres for a 30 total ratio. If the low-pressure compressor is modified to discharge at 2.5 atmospheres to form low-pressure compressor 24 instead of its normal 1.667, then the discharge temperature would be about 236° F. for a 59° F. ambient inlet. The inlet mass flow to the "core" of high-pressure compressor 44 would be 1.59 times as great if the compressed air is cooled to 100° F., considering a 3 percent pressure drop in the cooling process. The pitch-line radius, $r_2$, FIG. 4, would increase by about 1.26 times.

It is of particular interest to note that the change in radius of $r_1$ to $r_2$ with respect to high-pressure compressor radius 44, $r_3$, will be about 75 percent; that is considering $r_1$ to be unity in length, $r_2$ would be approximately 2 units in length and $r_3$ would be approximately $2\frac{3}{4}$ units in length or $\frac{3}{4}$ of a unit longer than the one unit length of $r_3$ as can be seen in FIG. 4. The added length of radius $r_2$ is critical in making it possible and practical to retain one single module of gas generator 20 and to provide the outlet elbow 100, diffuser 102 and the return "S" shaped inlet duct 104 all with the shafting 26 and 48 and forward bearing 80 arrangement confinements of the aero-derivative design. The radial length of the low-pressure compressor 24 radius $r_2$ can, however, range from 2.2 to 3.0 times that of the high-pressure compressor 44 radius $r_3$ to provide room for said inlet and exit ducting.

The "core" gas-turbine portion of the gas-generator module, that is the integral assembly consisting of the high-pressure compressor 44, the combustor 30, shaft 48, the high-pressure trubine 46 and associated casing can have a pressure ratio of 12 to 24 according to its design with the preferred ratio range being 18 to 24. The "core" portion can also have two spools such as the Rolls-Royce RB-211 with two compressors, turbines and shafts to form the high-pressure section and thus the "core". The LM5000 "core" (one-spool design) has an 18 compression ratio and the new $E^3$ "core" engine (also a one-spool design) has a compression ratio of about 23, giving examples The low-pressure compressor 24 of this invention would have a compression ratio of 1.8 to 3.2 to produce a 50 total pressure ratio, this total ratio considered prefereable for this invention although a total ratio as low as 35 or as high as 65 can also be considered and accomplished by varying the compression ratio of the low pressure compressor 24, the total ratio being the product of the high and low pressure ratios. It should be noted that the low-pressure compressor 24 and associated low-pressure turbine 28 are not extremely high-technology, high-temperature parts, and these parts can be readily modified by adding stages and diameter to obtain the required pressure ratio.

The mass-flow increase to the "core" portion of the gas-generator module is significant because the high-technology "core" portion would be a key part of a new gas generator 20 system developing significantly more power output in terms of discharge pressure and mass flow to the reheat combustor and power turbine 58, this power being in all practical purposes directly proportional to the increase in "core" massflow. There would also be an additional increase in gas generator power output because of the power saved by the intercooled compression process which will be discussed later.

The partially compressed and cooled air enters the high-pressure compressor 44 by way of inlet duct 104 and is further compressed by axial-flow compressor stages 116, 118, 120 and subsequent stages of a typical eleven-stage compressor to a high-pressure compression ratio of 12 to 24 as the case may be and as required. Additional high-pressure compressor stages can be added as required. The high-pressure compressor 44 can equipped with variable stator blades 122 and mechanism 124 to provide operating flexibility.

The high-pressure compressed air flows through gas-generator combustor 30 and is heated by fuel from fuel lines 34 before being expanded through the high-pressure turbine 46 and low-pressure turbine 28. FIG. 3 shows typically one turbine stage for the high-pressure nozzle vanes 126, rotating blades 128 and disk 130 but it should be noted that two or more stages can be applied. Similarly, one turbine stage of low-pressure nozzle vanes 132, rotating blades 134 and disk 136 are typically shown and two or more stages can be utilized. The hot gas exits by duct 51 to the diffuser 52 (shown in FIG. 6a).

PRESSURE CONTAINING CASING ARRANGEMENT

Figure 5:
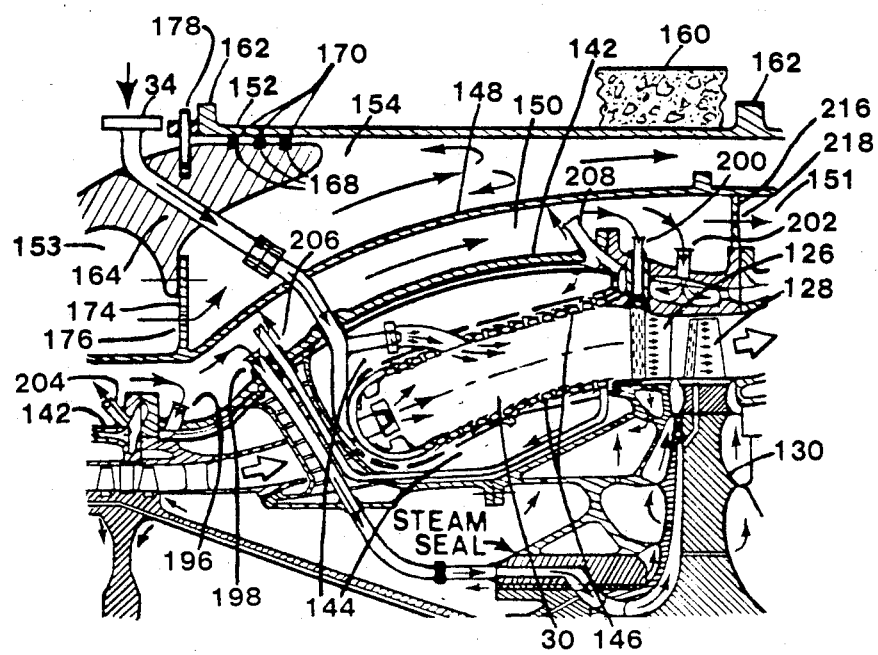
FIG. 5 is an enlarged plan view in section of FIG. 2 showing pressure-casing, expansion joint and cooling arrangement.

Reference is again made to FIG. 4 and the enlarged gas-generator portion given in FIG. 5 showing the high-pressure casing arrangement of this invention. The gas generator casing 142 retains the compressor discharge pressure in cavity 144 which surrounds annular combustor liner 146. A second casing 148 surrounds gas-generator casing 142 wherein a dual annular cavity 150 and 151 is formed. Cooling steam fills cavity 150/151 as will be subsequently explained. A third outer casing 152 surrounds casing 148 to form dual annular cavities 153 and 154 wherein bleed air from the axial compressor is deadended, as will be discussed.

A curved forward casing 156 attaches to the gas generator casing circumferentially at gas-generator compressor flange 158 (See FIG. 3) forming a leak-proof joint to prevent steam leakage. Inner casing 148 is thin-walled and flexible to allow for differential thermal and pressure expansion. Insulation 160 covers the entire outer surface. Fuel is fed to combustor 30 by fuel line 34.

Outer casing 152 is substantially thick enough to prevent pressure distortion or blow-out with an adequate safety factor and is stiffened by ribs 162 as required. Forward casing 156 likewise has a thick enough section 164 to prevent pressure distortion but has a thin enough side wall 166 to allow for some flexibility. Forward casing 156 has three or more annular grooves 168 wherein seal piston rings 170 fit similar to those of a piston of a large reciprocating engine. The grooves 168 are deep enough for piston rings 170 to compress and expand. Another set of grooves 168' and rings 170' are located at the rear of the gas generator at connection ring 172. The outer casing 152 is thus allowed to float axially and radially so to speak as the temperature of the gas generator casings 142 expands. This differential expansion can be considerable at the temperature involved. Stiffening and support ring 174 is thin-walled and can have an expansion loop if required. It can also be noted that orifices 176 allow deadended compressor air to flow back and forth in forward cavity 153 and rear cavity 154.

Casings 148, 152, 156 and associated parts can all be fabricated out of high-strength steel and no expensive stainless or exotic materials are required such as may be required for the gas generator casing 142.

Piston rings 170 seal the outer casing 152 to the matching parts 164 and 172 to prevent leakage but yet allow relative movement axially and radially between the parts. The rear diameter of casing 152 and flange 172 and rings 170' can be slightly smaller than the diameter of the forward parts 152, 164 and 170 to allow cylindrical casing 152 to be slipped into place from the rear. Assembly and disassembly of the outer casing 152 is thus made quite easy and fast.

Locking pins 178 which are free to float secure and anchor the casing 152 to part 164 and subsequently to gas generator compressor casing flange 158. There can be 2 or more of pins 178 equally spaced around casing 156.

Piston-ring seals are used in gas turbines and other apparatus for expansion joints and are not unique in themselves, but this application of the double piston sealing ring arrangement is quite different than those previously known or disclosed.

Figure 6A:
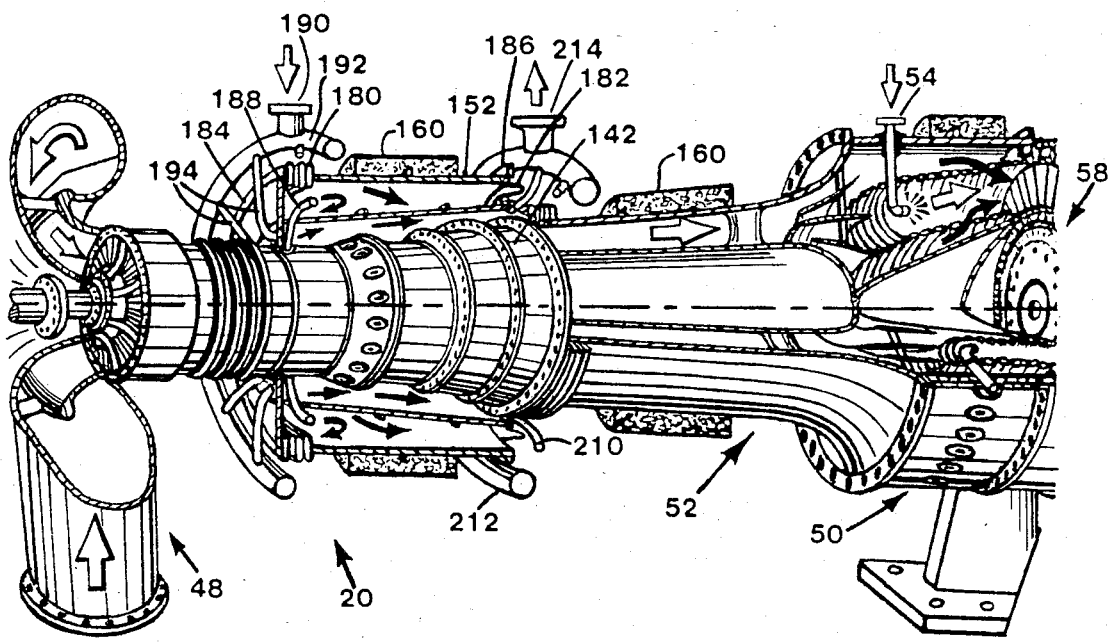
FIG. 6a is a perspective view of the gas generator high-pressure section showing low-pressure compressor on the left and diffuser, reheat combustor and power turbine on the right.

Alternately, referring to FIG. 6a, the thermal expansion between the gas generator casing 142 and the outer casing 152 can be accomodated by bellows-type expansion joints 180 and 182 with connecting flanges 184 and 186 for assembly and disassembly.

The casing arrangement of this invention allows a substantially conventional gas generator with thin walls to be used for much higher pressures than normal. As an example, the LM5000 gas-generator casing is designed for 30 atmospheres of pressure. When operating at the higher pressure through intercooling and supercharging, the casing will operate at 40 to 60 stmospheres and will not be strong enough to prevent distortion and possible rupture without the strong outer casing arrangement.

Reference is again made to FIGS. 3 and 6a showing the compressor bleed air line 188 which pressurizes dual cavities 153 and 154. The air pressure will be somewhat higher than half that of the compressor discharge. As an example, for a 50 atmosphere discharge pressure, the correct compressor stage is selected to provide about a 30 atmospheric pressure to surround casing 148 and pressurize outer casing 152 through cavities 153 and 154. The outer casing 152 thus is subjected to a substantially lower pressure than the compressor discharge pressure. Inner casing 148 is subjected to the differential pressure of 50 minus 30 or about 20 atmospheres. Steam chamber 150 is selected to be slightly more than 50 atmospheres for the 50 cycle pressure ratio, as will be discussed. The air pressure in cavities 153 and 154 has no outlet and flow is normally zero with the deadend situation. Flow only occurs during startup, load changes or shutdown to charge or discharge cavities 153 and 154.

Cooling steam enters cavity 150 by means of flange connection 190 to ring distribution header 192 then to connect to flexible tubing pipes 194. The steam is produced by a heat recovery boiler and/or is extracted from a steam turbine at a pressure substantially equal to the compressor discharge pressure or preferably at a pressure 30 to 50 psi greater. The steam surrounds gas generator casing 142 and thus neutralizes the internal-annular-discharge air pressure. In fact, the gas generator casing 142 can be placed in a slight condition of compression by the 30 to 50 psi added pressure.

The steam is prefereably dry and saturated for maximum cooling capacity with maximum specific heat and the lowest temperature. However, the steam can have 10° to 30° F. superheat to insure dryness as no water particles should be present at entrance through pipes 194. The steam cools the gas generator casing 142 as required. Baffles not shown can be applied to control the flow around the casing 142 if required to control casing 142 cooling.

Again referring to FIG. 5, cooling steam in cavity 150 flows to inner casing 142 by means of open tubing 196. Cooling steam enters open tubing 198 to cool the first-stage turbine disk 130 and blades 128. Cooling steam enters nozzle-vane opening 200, one or two for each vane, to cool each first-stage nozzle vane 126. Cooling steam enters opening 202 to control the cooling of gas generator casing 142 rear section. Thus cavity 150 serves as an annular plenum or cooling steam distribution chamber. Hot steam can be taken out of turbine 20 by outlets 204, 206 and 208 for admission back to the steam turbine, but the exit connections or external headers for these tubes are not shown. Alternately, this hot steam can be piped by tubing not shown to rear steam cavity 151 downstream of orifice 218. Cooling steam not used for internal gas-generator cooling is discharged at a higher temperature through tubing 210 to ring header 212 and through flange 214.

Dam 216 with orifice or orifices 218, in number as needed control downstream steam pressure as required to lower the downstream pressure and control total steam flow to header 212.

Control of steam pressure and flow to cavity 150/151 during startup and shutdown of gas generator 20 can be by means of computer control of a pressure regulating valve not shown that feeds steam to flange 190 and ring header 192. Such control prevents over-pressurizing inner cavity, 150/151 and endangering blowout of inner casing 148 under transient conditions.

Figure 6B:
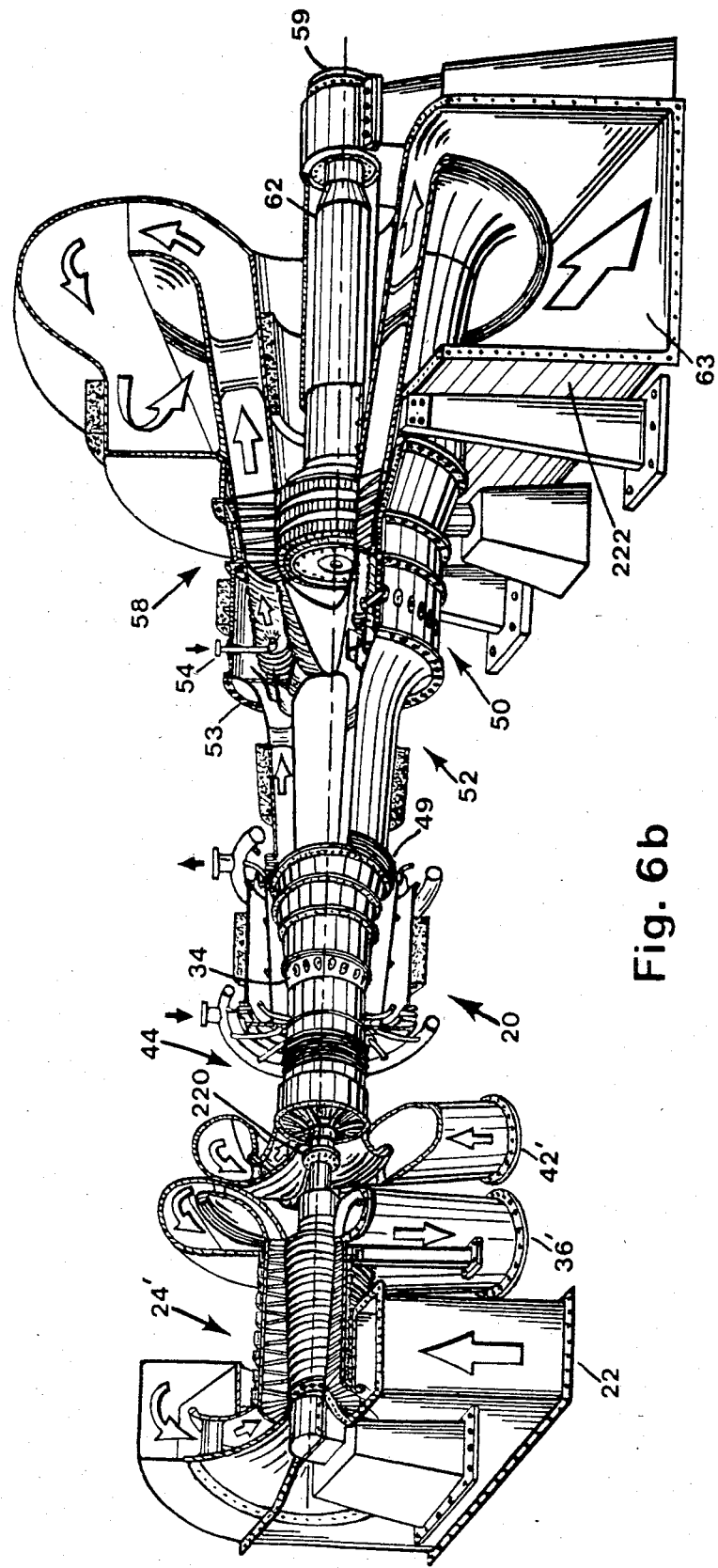
FIG. 6b is a perspective view with partial section of compression-intercooled reheat gas turbine incorporating an industrial low-pressure compressor in the gas generator.

Reference is made to FIG. 6b showing a perspective view with partial section of an intercooled reheat gas turbine incorporating a separate and independent industrial-type low-pressure compressor 24' coupled to the high-pressure compressor 44 by coupling 220 and exhausting to intercoolers 38 and 40. Gas generator 20 exhausts through diffuser 52 to reheat combustor 50 and expands heated gas by power turbine 58 which drives load 60 by C shaft 62 being connected thereto by coupling flange 59. The power turbine hot gas exhausts through exhaust hood 222 to a heat recovery boiler not shown. Diffuser 52 is connected to gas generator 20 by means of expansion joint 49 and is connected to reheat combustor 50 by means of flange 53. Diffuser 52 can be a separate assembly which can be removed independently of gas generator 20 or reheat combustor 50 and power turbine 58 assembly.

Present-day aero-derivative gas generators such as the GE LM500, GM 570K, R-R RB211 drive through the cold end, that is have an inner coaxial shaft extending through the gas generator with a coupling flange connection protruding out the center of the high-pressure air compressor 44. Some heavy-duty non-aero industrial gas turbines likewise drive out the cold (compressor) end. It is therefore possible to drive a separate low-pressure compressor of this invention by such gas generators. This physical arrangement, per se, is not unique. It is, however, unique to drive a specifically and specified low-ratio compressor of a low-pressure ratio of 1.8 to 3.2 for intercooling and specifically for a combined cycle for optimum combined-cycle efficiency. For instance, the Japanese Government reheat gas turbine AGT-J-100A intercools at a 4.85 low-pressure ratio. Also, supercharging by large forced draft fans to 50 inches of water and cooling by humidification has been used but not at the specified low-pressure compressor ratio of this invention. Secondly, the pressurizing container required for aero-derivative light-weight casings is likewise quite unique. No such process or arrangement has ever been proposed or contemplated before, to this inventor's knowledge.

CASCADE AIRFOIL DIFFUSER

Reference is now made to FIGS. 7a, 7b, and 8 showing a unique low-pressure compressor-diffuser arrangement of a cascade-airfoil configuration, which is part of this invention, to convert a greater amount of velocity head to static pressure than made possible by the apparatus of FIGS. 3 and 6a. As stated, the straight wall vaneless diffuser of FIGS. 3 and 6b can only recover about 65 to 70 percent of the velocity head. The cascade airfoil diffuser of this invention can increase this conversion from the 65 to 70 percent level to approximately 85 to 90 percent. The process and associated apparatus will now be explained. Convenient gas generator 20 duct connections can also be provided, as will be explained, to install and remove said gas generator.

Air is discharged from the low-pressure compressor 24 through elbow 100. One or more turning vanes 224 are attached to elbow wall 226 by radial struts 228. The turning vanes 224 prevent flow distortion and separation. The radial discharge of the elbow 100 enters typically 12 sections of essential rectangular cross-sectional ducts 230 each bounded by inner wall 232, outer wall 234 and side walls 236 and 238. There can be fewer or more than 12 sections of duct 230 but typically there are 12, 3 of which can be seen in FIG. 8. Side walls 236 and 238 can have an included divergent angle of zero to 30 degrees, but preferably no more than 20 degrees, that is 10° on each side wall 236 and 238. Inner wall 232 and outer wall 234 each curve outwardly like the outlet of a horn. The ratio of the rectangular cross-sectional area at the radial entrance 240 to that of the exit 242 can be typically about 4 to effect a velocity change of 4. Typically the discharge velocity at exit 240 will be about Mach 0.3 which translates to about 400 ft/sec for the flowing temperature involved. The exit 242 velocity would be about 100 ft/sec (Mach 0.075).

Separation and thus channeling of the air causing eddy currents and velocity-pressure-head dissipation is prevented by a series of two or more stages of cascade airfoils. Three stages are shown in FIG. 7a. The first stage has airfoils 246, the second stage has airfoils 248 and the third stage has airfoils 250.

The airfoils are held in precise position by radial-duct sidewalls 236 and 238. Welding can be used. Each inner duct is supported by struts 252. The airfoils 246, 248 and 250 are precisely shaped according to specific specifications provided by NASA or the RAF to produce the lowest drag and best lift (and thus diffusion) for the associated velocities. The surfaces of the airfoils are very smooth similar to stator vanes of an axial-flow compressor to reduce friction and loss. Referring to FIG. 7b, the airfoils are positioned to have a precise angle of attack, $\beta$, at leading edge point A to provide the lift and associated downstream diffusion with a low drag (pressure loss). The airfoils diffuse the hot air as it flows from the maximum width point B and then to the trailing edge point C. Each stage of cascade airfoils is staggered so that the wake of the upstream airfoils will not interfere with the downstream airfoil.

The hot air is diffused efficiently without separation by the cascade airfoil arrangement. The air flow and direction thereof is controlled so it will fan out or spread apart. The direction of flow of the air at the inner surface 234 is mostly tangential to the inner surface and the flow at the center pitch line is tangential to the center pitch line and the outer surface flow is tangential with the outer surface 234. The direction of the flow with respect to the radial position can be curved backwards to give space for flange 258, expansion joint 260 and transition 262. The curvature can also be slightly forward with less curvature of elbow 100 and with the inlet 280 being moved farther backward to increase the curvature of the "S" shape of the inlet 280.

The gas, after leaving the cascade airfoil diffuser section, passes through an expansion joint 260 which has internal flow shielding not shown to form smooth internal surfaces. Flanges 264 and 266 connect the expansion joint 260 to the ducting. The air then passes through the transition piece 262 which changes the rectangular duct cross-section to a round cross-section at round flange connection 268. The air is diffused further in the process and the exit velocity at flange 268 is now about 50 to 75 ft/sec, or the desired velocity for low pressure loss flow for the piping and ducting 36 to the intercoolers 38 and 40 and the return ducting to the high-pressure compressor 44. The air, after leaving transition piece 262, enters a toroidal-shaped ring-type duct 270 with two outlet connections 272, one on each side of ring duct 270. The air flow is aided by internal turning vanes 274. Flanges 276 are connected to line 36 which ducts the air to intercoolers 38 and 40.

The cooled air is returned to gas generator 20 by return air line 42 which is connected to said gas generator by flange connection 278 one on each side of said gas generator 20. The "S" walled inlet ducts 280 which are on each side of said gas generator 20 have a generous cross-sectional area to provide a low velocity inlet of 50 to 75 ft/sec or as required for low-pressure loss. Guide vanes 282 held by struts 284 guide the air to the high-pressure compressor 44 as can be seen in FIG. 7a.

The exit flange 276 and the inlet flange 278 can be readily disconnected to allow gas generator 20 to be installed and removed for overhaul. Toroidal-shaped ring duct 270 need not be removed. Transition pieces 262 and a section of return duct and associated expansion joint not shown that connects line 42 to inlet flange 278 can be removed to allow clearance. FIG. 8 shows the transition ducts 262 as having been removed.

The straight-wall vaneless diffuser of FIGS. 3 and 6b will only provide an effective area ratio change of about 2 without flow separation and the exit velocity will be about 200 ft/sec resulting in a maximum of some 70 percent velocity pressure recovery when considering the velocity head varies as the square of the velocity. Also the outlet and inlet ducts for the configuration shown in FIG. 3 extend radially outward which necessitates a longer radial distance making it more clumsy to disconnect the gas generator 20 from outlet lines 36 and inlet lines 42. The design and assembly of the gas generator 20 becomes more complicated and disassembly for overhauls would likewise be more difficult. There are these additional advantages favoring the apparatus arrangement shown in FIG. 7a 7b and 8.

The gas generator 20 of this invention consists of individual modular sections which are assembled one to another to form a complete assembly which is essentially cylindrical in shape. The low-pressure compressor 24 with discharge duct 36 or 230 module fits to the high-pressure compressor 44 and return inlet duct 42 or 280 modules. The high-pressure section 44/42 or 280 fits to the combustor section 30. The combustor section 30 fits to the high-pressure turbine 46 assembly which then fits to the low-pressure turbine assembly 28. The shafting and bearing parts 26, 48, 80, 84 and 86 and their associated sub-parts are assembled with the aforementioned modules to connect the rotating parts together. The outer-casing assembly consisting of parts 48, 152, 164 and 166 and associated sub-assembly parts fit over the high-pressure section of gas generator 20.

All these assemblies or sub-modules comprise one complete total module thus forming gas generator 20.

Such a modular assembly of aero-derivative gas generators is well known by those skilled in the art. Only the addition and arrangement of (a) the exit elbow 100, diffuser 102 or 230 and duct connection 36, (b) the return parts consisting of the duct connection 42, the "S" shaped duct 104 or 280 turning vanes 282 and the like and (c) the pressurizing casing parts 148, 152, 164 and 166 are new, all made possible by the oversized low-pressure compressor with a longer radius, r. This unique arrangement allows more or less standard "core" parts of high-temperature high-technology to be wedded with the lesser technology low-pressure compressor, the duct connections and the pressurizing cannister assembly to form the complete cylindrically-shaped module of gas generator 20.

THERMODYNAMIC ANALYSIS

The thermodynamic analysis of the heat-rate advantage of this invention will now be presented pinpointing the best intercooling low-pressure-compressor pressure-ratio range for optimum combined-cycle efficiency and the specific intercooling pressure for optimum combined-cycle efficiency of this invention. Increased power output derived by intercooling will be set forth.

The general reheat-gas-turbine cycle arrangement is given in the schematic diagram of FIG. 1. Air is compressed in a low-pressure compressor 24 which is driven coaxially by turbine 28. Said air is diffused and then ducted to intercoolers 38 and 40 where said air is cooled before being ducted back to be further compressed by high-pressure compressor 44 driven by turbine 46. High-pressure air at 40 to 60 atmospheres is heated in first combustion chamber 30, is then expanded through turbines 46 and 28, is subsequently fully diffused by diffuser 52 and then reheated in second combustion chamber 50 at a total pressure of 4 to 9 atmospheres, depending on the cycle-pressure ratio and amount of steam-cooling/injection and is finally expanded to atmospheric pressure through power turbine 58 to drive load 60. The hot exhaust gases generate steam in a boiler for a conventional 2400 psig reheat-steam turbine not shown. The reheated gas can be at a temperature of 2000° to 2500° F. or higher.

The intercoolers can be made in two sections 38 and 40 with condensate being used to cool the high end and cooling water used to cool the low end as shown in FIG. 1. The following expected and typical pressure losses are assumed for the intercooler. These losses are expressed as percentages of the compressor intercooler total pressure:

| LPC Diffuser Loss % | .50 |
| LPC Exit Loss % | .25 |
| IC Loss % | 2.00 |
| HPC Entrance Loss % | .25 |
| Total Loss % | 3.00 |

Incremental parasitic heat and mechanical losses that must be assigned to the incremental additional work saved by the intercooling process are also associated with the intercooler. These losses are assumed to be constant at five percent of the gross incremental work saved and are listed as follows:

| Generator Loss | Bearing Loss |
| Combustion Loss | Air Leakage |
| Radiation Loss | Auxiliary Loss. |

The intercooler is sized to effect an exit temperature of 100° F. when considering a standard 59° F. day. The minimum approach temperature is thus considered to be 41° F.

The adiabatic compression efficiencies of both the low-pressure and high-pressure compressors are assumed to be 88 percent. No attempt is made to increase the efficiency at the low-pressure end or decrease the efficiency at the high end to simulate what actually takes place.

Figure 9:
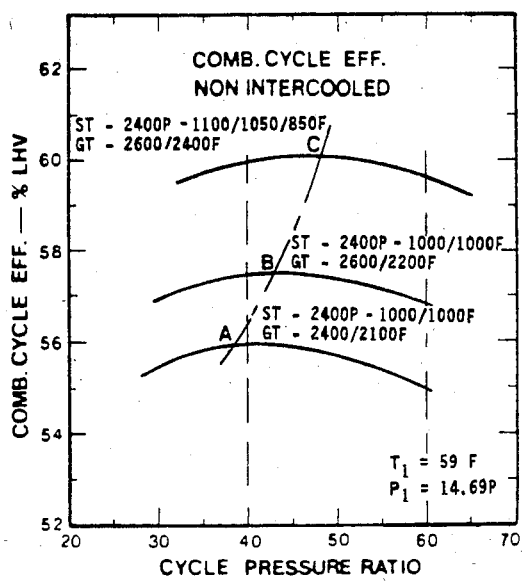
FIG. 9 is a graph of combined-cycle efficiency as a function of cycle-pressure ratio, firing temperatures and steam conditions.

Careful studies of the non-intercooled reheat-gas-turbine combined cycle have produced data for the three curves shown in FIG. 9. Note that three different gas-turbine initial and reheat firing temperatures are shown, namely: (a) 2400°/2100° F., (b) 2600°/2200° F. and (c) 2600°/2400° F. Also, as can be seen, two different steamreheat temperature levels are given for the 2400 psig initial pressure. These are: 1000°/1000° F. and 1100°/1050°/850° F. for the double reheat. Higher steam and gas temperature can be considered.

Each curve representing the gas-turbine and steam-turbine-temperature conditions peaks out at a specific cycle-pressure ratio as shown at point A 38 cycle pressure ratio (CPR), B 44 CPR and C 48 CPR. These three curves are considered as the basic standards for comparing the intercooled cycle in terms of overall maximum-cycle efficiency obtainable for the conditions given.

Referring to FIG. 1 again, it is assumed that the work saved by compression intercooling is extracted through A shaft 26 and that the rest of the reheat-gas-turbine cycle remains unchanged with the exception of incremental heat being added to the first combustor to heat the air back to the original compressor-discharge temperature associated with the non-intercooled compression for any given cycle-pressure ratio.

This procedure greatly simplifies the analysis and neglects the small variations introduced by the heat required to vaporize and/or heat the fuel, the expansion work of the fuel itself and the slight increase in the second combustor pressure due to the savings in compression work and the incremental fuel-expansion work when considering a fixed exhaust temperature. Also, the very small amount of low-level heat recovery by the condensate, if this scheme is used, is neglected for the sake of simplicity.

Finally, with reference to FIG. 9 the three basic non-intercooled gas turbines employ steam as the blade and combustor coolant and therefore, a lower compressor-discharge temperature resulting from the intercooling and resulting cooling-air fluctuations does not enter into the reheat-gas-turbine cycle to distort the results.

There are three basic thermodynamic formulas to apply in calculating compression work and temperature rise. The first formula deals with the change in enthalpy of the air and thus the work of compression:

$$(H_2 - H_1) = \frac{wC_p(T_2 - T_1)}{n} \quad (2)$$

where $(H_2-H_1)$ is the enthalpy change and work required, w is the weight flow, $C_p$ is the specific heat considered to be constant, $(T_2-T_1)$ is the change in temperature resulting from the compression at constant entropy and n is the adiabatic compression efficiency.

The second formula gives the relationship of temperature and pressure ratio as follows:

$$T_2 = T_1 \left(\frac{P_2}{P_1}\right)^{\frac{k-1}{k}} \quad (3)$$

where $T_1$ and $T_2$ are the absolute temperatures before and after compression, $P_2$ is the absolute pressure after compression, $P_1$ is the absolute initial pressure and k is the gas constant (ratio of the two specific heats $(C_p/C_v)$. This formula is based on a constant entropy compression with no losses, thus, at 100 percent efficiency.

The third formula is a combination of the two previous formulas and gives the temperature rise of compression which is directly related to the work of compression and the heat content of the air:

$$\frac{(H_2 - H_1)}{w\,C_p} = \frac{(T_2 - T_1)}{n} = \frac{T_1\left[\left(\frac{P_2}{P_1}\right)^{\frac{k-1}{k}} - 1\right]}{n} \quad (4)$$

The specific heat of air $(C_p)$ is considered to have a constant value of 0.24 BTU/lb -°F. (1.005 KJ/Kg-°C.) and the gas constant k is considered to be 1.4.

The aforestated three formulas and assumptions will produce close results which are valid for incremental compression work saved through intercooling and incremental heat added after compression to raise the temperature back to the non-intercooled level. More exact results using the gas tables are not warrented for comparison and relative compression work and changes in cycle efficiencies.

Figure 10:
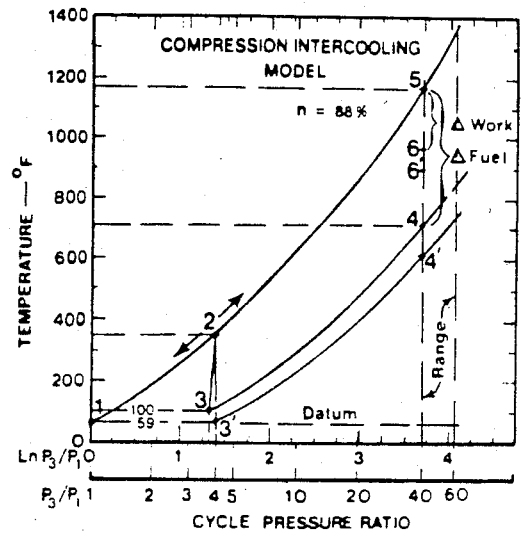
FIG. 10 is a graph showing the relationship of compressor temperatures to cycle-pressure ratio.

Formulas (2), (3) and (4) can be used to develop plots of temperature versus pressure ratio as given in FIG. 10 where, for an inlet temperature of 59° F., the outlet temperature for any given ratio is plotted against the natural log of the pressure ratio. The natural log of pressure ratio is used to shrink the higher pressure-ratio scale and broaden the lower ratio scale where needed for closer analysis. The actual pressure ratios are given by the lower scale for easy reference.

Air is compressed from point 1 to point 5 without intercooling. This locus of temperature points is used as a standard for comparison.

Considering intercooling, air is first compressed from point 1 to point 2 at which point the air is cooled by the intercooler to point 3. The air is then compressed further to point 4. The total work of compression is represented by the sum of the two temperature differences: accordingly $(T_2-T_2)+(T_4-T_3)$. This temperature difference summation is given as point 6 in FIG. 10. Obviously the incremental work saved by the intercooling process is represented by $(T_5-T_6)$.

The extra heat required to heat the air back to temperature $T_5$ without intercooling (and thus the incremental heat to be added) is represented by $(T_5-T_4)$ in FIG. 10.

The intercooling pressure at point 2 can be varied from a pressure ratio of 1 to 60, for purposes of analysis, giving complete data of incremental work saved and incremental heat added. The incremental cycle efficiency is then readily calculated using formula (5) which incorporates the 5 percent parasitic losses:

$$E_i = \left[1 - \frac{T_2 - T_3}{T_5 - T_4}\right] \times .95 \quad (5)$$

where $E_i$ is the incremental cycle efficiency of the intercooling process and where the numerical subscripts refer to FIG. 10.

This analysis assumes that the compression work saved will be hypothetically extracted out shaft A of FIG. 1 so that the rest of the cycle is not disrupted. This assumption is valid for purposes of a general analysis within the scope of accuracy of the other assumptions. The total cycle would have to be evaluated for precise accuracy where more exact values of compression efficiency, expansion efficiency, pressure losses and the like are known for a specific design.

Figure 11:
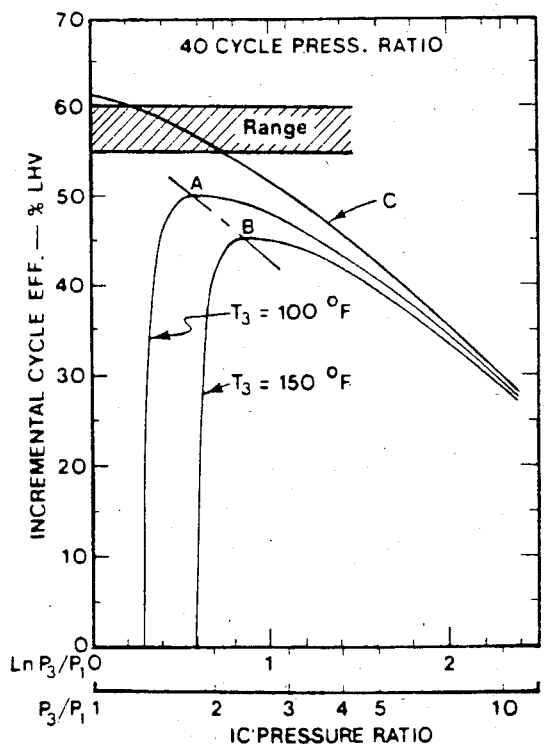
FIG. 11 is a graph showing incremental cycle efficiency versus intercooler pressure ratio for a 40 cycle pressure ratio condition.
Figure 12:
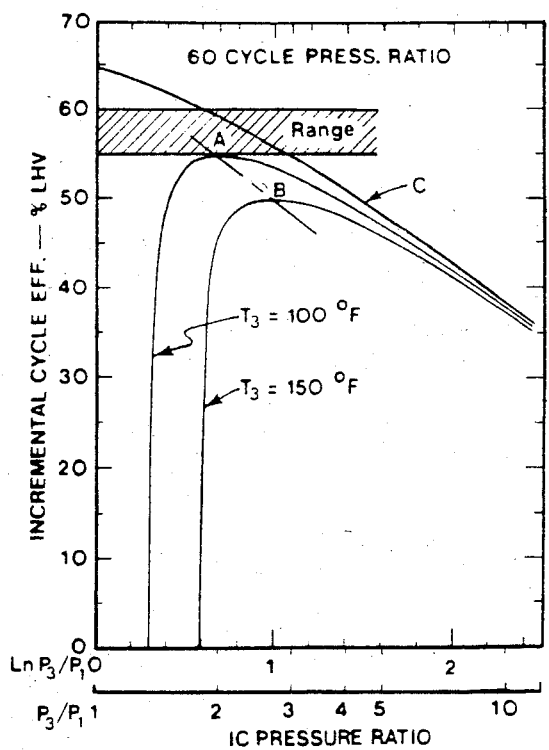
FIG. 12 is a graph showing incremental cycle efficiency versus intercooler pressure ratio for a 60 cycle pressure ratio condition.

First, considering no intercooler pressure loss and considering the air to be cooled all the way to the standard inlet temperature of 59° F., a graph of incremental cycle efficiency versus the natural log of cycle pressure ratio is obtained as given in the top lines C of FIGS. 11 and 12 for two total cyclepressure ratios of 40 and 60, the general area of concern. Note that FIG. 10 presents an example for a CPR being intercooled at a 4 pressure ratio.

It can be seen that the incremental cycle efficiency is maximum at very low intercooling pressures and falls off as the intercooling pressure rises. The efficiency is zero at full cycle pressure because no incremental work is saved. Also it can be noted as ascertained from FIG. 9 that the combined cycle efficiency range is from 55 to 60 percent as shown by the shaded area of FIGS. 11 and 12. Therefore the only way intercooling can possibly improve or equate to the known combined cycle efficiency is in the low intercooling pressure-ratio range of about 1.8 to 3.2 when considering high-turbine inlet temperatures above 2400° F. Beyond a pressure ratio of 3, the combined cycles of FIG. 9 (points A, B and C) will be degraded in proportion to the amount of incremental work saved and the incremental efficiency derived.

Using the model of FIG. 10 developed from Formula (5) and the zero intercooler pressure-loss target curves C of FIGS. 11 and 12, more realistic plots of incremental efficiency versus intercooling pressure ratio can now be developed for both the 40 CPR and 60 CPR cases. As stated earlier, a 3 percent total intercooler pressure loss is believed to be realistic and is assumed. Also, the air is assumed to be cooled to 100° F. and alternately to 150° F. for comparison to the theoretical curves C of FIGS. 11 and 12. Reference is made to FIG. 11 for the 40 CPR case and FIG. 12 for the 60 CPR case where an intercooling ratio span of 1 to 10 is explored.

A shaded area representing the combined-cycle efficicney range of 55 to 60 percent taken from FIG. 9 can be seen at the top of each graph. As can be noted, the incremental cycle efficiency for intercooling (40 CPR and 60 CPR) for both the 100° F. and the 150° F. high-pressure compressor (HPC) inlets peak out below the combined-cycle efficiency being considered as 55 percent efficiency, (points A and B) which indicates that intercooling can only degrade combined-cycle efficiency relative to the amount of incremental compression work saved.

It can be noted that the incremental cycle efficiency plunges to zero at the critical low-intercooling pressures because of the assumed pressure loss of 3 percent and the inlet temperature to the HPC exceeding the normal compression temperature.

The most important consideration is at what intercooling pressure the incremental cycle efficiency peaks; that is points A and B of each of FIGS. 11 and 12. The maximum efficiency as can be observed occurs at rather low return pressure, $P_3$, to the HPC and is about 1.8 for 100° F. and 40 CPR and about 2.0 for 100° F. and 60 CPR. The curves remain somewhat flat and then fall off at a more constant rate as the intercooler pressure increases to 2.5 and 3 respectively.

A further observation made is that the intercooling incremental cycle efficiency lines for both 100° F. and 150° F. for the 3 percent pressure loss never cross the theoretical top lines C representing 59° F. HPC inlet and zero pressure drop. It can be concluded that minimum pressure loss and minimum HPC return temperature should be sought to yield maximum incremental efficiency.

Figure 13:
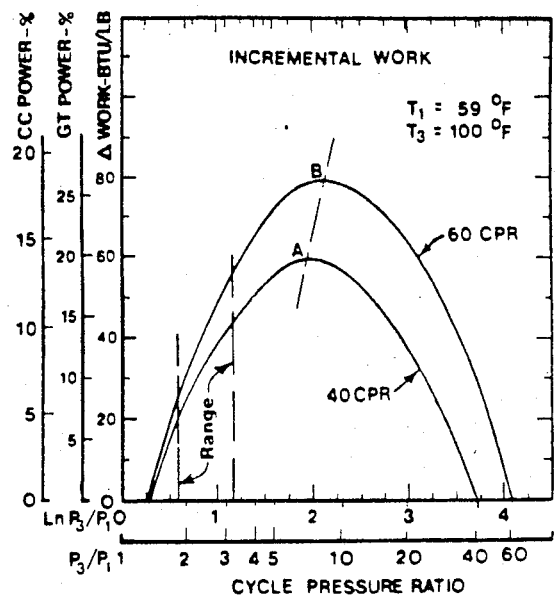
FIG. 13 is a graph showing incremental work saved by intercooling as a function of cycle pressure ratio for 40 and 60 cycle pressure ratio conditions.

There is another factor that must be considered to obtain the overall combined-cycle degradation. This factor is the amount of incremental compression work saved by the intercooling process. Reference is made to FIG. 13 which is a plot of incremental work in BTU/lb of airflow versus pressure ratio for both the 40 CPR and 60 CPR cases and for 100° F. HPC inlet and 3 percent pressure loss.

It can be seen that maximum work saved by intercooling occurs at the square root of the total pressure ratio, points A and B of FIG. 13. The incremental specific work, $W_i$, saved can be determined by applying formula (6) following:

$$W_i = C_p[(T_5 - T_2) - (T_4 - T_3)] \times 0.95 \tag{6}$$

where $C_p$ is the specific heat considered to be 0.24 BTU/lb −°F. (1.005 KJ/Kg−° C.) for standard air and where the numerical subscripts refer to FIG. 10.

An intercooler pressure range of 1.8 to 3.2 is shown in the range area where incremental cycle efficiency remains at a relatively high level. These lower intercooler pressures must be considered for maximum combined-cycle efficiency, but nevertheless at some sacrifice in overall combined-cycle efficiency and moreover at less than maximum incremental gas turbine and combined-cycle output. The ordinate has an additional scale for percent gas turbine power increase and another for percent combined-cycle power increase based on calculated values of 303.36 BTU/lb net work for the gas turbine and 121.49 BTU/lb net work for the steam turbine.

Intercooling does increase gas turbine output from about 6 to 14 percent and combined cycle output by 4 to 10 percent for the range shown in FIG. 13.

The effect intercooling has on combined cycle efficiency can now be determined by applying the known calculated data of a combined cycle for both the 40 CPR and 60 CPR cases for 100° F. HPC inlet tabulated below:

|  | BTU/lb |
| --- | --- |
| Gas Turbine Output | 303.36 |
| Steam Turbine Output | 121.49 |
| Total Fuel Input (LHV) | 740.03 |
| Net Cycle Efficiency (LHV) | 57.41%. |

The incremental values for intercooling are added to the above values and then equated to percentages. The results are given in FIG. 14 where combined-cycle efficiency loss is plotted against the intercooler pressure ratio (outlet of the low-pressure compressor).

Figure 14:
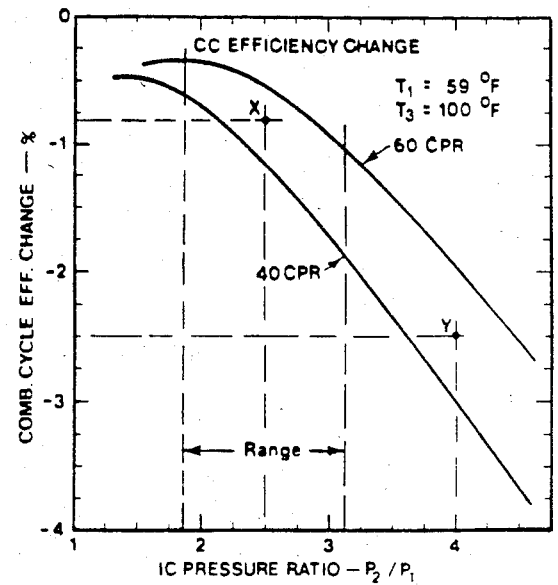
FIG. 14 is a graph showing percent change in combined-cycle efficiency as a function of intercooler pressure ratio for 40 and 60 cycle-pressure ratio conditions.

The range to be considered is shown to be about 1.8 to 3.2 as shown in FIG. 14. The combined cycle degradation can be as great as 4.5 percent at a six pressure ratio, but for practical considerations for a more reasonable intercooler pressure ratio of about 2.5 for 40 CPR the degradation would be about 1.2 percent and about 1.0 percent for the 60 CPR at a pressure ratio of about 3.

These values can now be applied to FIG. 9 to arrive at projected overall combined-cycle efficiency. As an example, considering a 50 CPR intercooler pressure of 2.5 and conditions of line B of FIG. 9 the net combined-cycle efficiency would be as follows:((57.3 (1−0.008)=56.8 percent LHV)) with reference to point X of FIG. 14. If the intercooling pressure ratio is raised to 4 then the combined cycle efficiency would fall thus: ((57.3(1−0.0250)=55.9 percent LHV)) with reference to point Y of FIG. 14.

The above examples show how important intercooling pressure ratio is with regard to combined cycle efficiency. It should, however, be pointed out that at the 4 intercooler pressure ratio the combined-cycle output is projected to be increased by about 12 percent for a given airflow in accordance with FIG. 13 whereas the increase in output at the lower 2.5 pressure ratio would only be about 8 percent.

Figure 15:
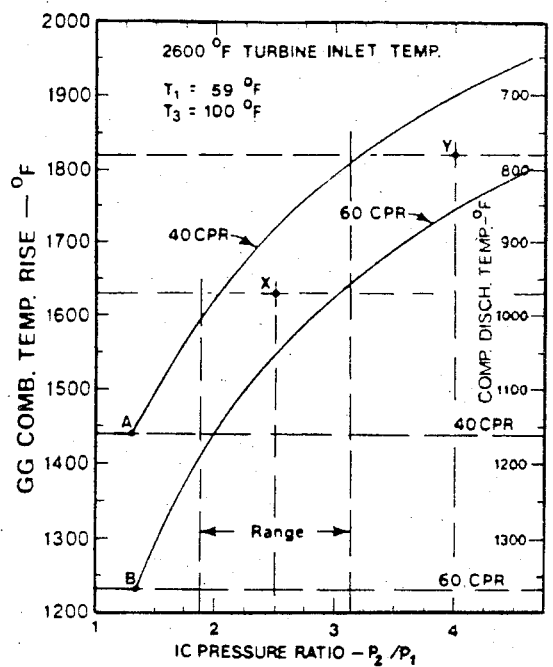
FIG. 15 is a graph showing gas generator combustor inlet temperature rise and compressor discharge temperature as a funtion of intercooler pressure ratio for 40 and 60 cycle-pressure ratio conditions and 2600° F. gas inlet temperature.

There is one final additional consideration regarding intercooling which deals with the gas-generator combustion temperature rise (GGTR) and the HPC discharge temperature (CDT). FIG. 15 is a plot of the GGTR and the CDT versus the intercooler pressure ratio for both the 40 CPR and the 60 CPR cases.

As the intercooler pressure ratio rises, the GGTR also rises as shown and conversely the CDT falls. More fuel is burned in the gas-generator combustor as the intercooler pressure increases.

The intercooler pressure ratio range to be considered for best combined-cycle efficiency is given in FIG. 15 and corresponding GGTRs and CDTs can be compared in regard to changes in combustion radiation heat, combustor cooling and $NO_x$ control. It is worthy to note that as the GGTR becomes greater with more fuel being burned, the oxygen content of the gas to the reheat combustor will decrease and the gas will also be vitiated with steam from blade cooling and $NO_x$ control. Therefore, the safe flamability limits and the complete combustion could become a problem at some point.

Intercooling according to the teachings of this invention degrades combined-cycle efficiency. This degradation as given in FIG. 14 starts from about 0.8 percent, point X at the optimum intercooling ratio range of 1.8 to 2.2 and increases rapidly to about 2.5 percent at a 4 ratio, point Y for the 41° F. intercooled approach temperature to the atmospheric temperature (100°−59°=41° F.). Cooling to a closer temperature would reduce this loss only slightly.

The term effectiveness is often used to describe heat transfer parameters and surface areas. Effectiveness is the ratio of the temperature reduction achieved divided by the full potential to an ambient or coolant datum. Some studies have indicated an effectiveness as high as 95 percent which would yield a very low approach temperature of some 10° F. instead of the 41° F. for the 100° F. inlet to the high pressure compressor. Of course a lower return temperature would reduce the degradation according to the teaching of this invention and in particular with reference to FIGS. 11 and 12. However, the lower the approach temperature and the higher the effectiveness, the higher will be the intercooler pressure loss, offsetting the efficiency gain; greater intercooler heat transfer surface area will be required. The 41° F. approach seems reasonable because there is little to be gained in going to a lower approach temperature in terms of gain in combined-cycle efficiency.

FIGS. 11, 12 and 14 clearly show that the best intercooler pressure ratio for maximum efficiency is very close to 2.0 and when considering extra power saved according to FIG. 13 this ratio can be extended to about 2.5 without excessive combined-cycle efficiency loss. This ratio can be further extended to 3.2 before cycle efficiency degradation becomes excessive.

The gas generator of this invention has the capital cost advantages of factory pre-assembly and test. One single module assembly is made possible whereby the low-pressure compressor and high-pressure compressor with the coaxial shafting can be made up of various individual modules of an aero-derivative approach. There is no flexible coupling between the two compressor components and only one bearing is needed for the low pressure compressor. Radial and longitudinal space is made available for air exit and readmittance because of the larger radius of the low-pressure compressor.

The aero-derivative high-pressure casings with the advantages of thin parts for low thermal stresses can be retained through the adaptation of the heavier external pressurizing casing. The thick casing and associated parts can be fabricated out of ordinary high-strength steel and will not be expensive. Manufacturing costs savings can be realized by using more or less standard designs of existing and future fan engines. Interchangeability of parts is another advantage of the gas generator of this invention.

The pressurizing container placed over the high-pressure gas generator thin casing makes it possible to apply existing aero-derivative gas generators that can drive an industrial-type low-pressure compressor through the cold end of the gas generator thereby broadening the scope of this invention. The gas generator can be adapted to burn both liquid and gaseous fuels and there is a particular advantage in considering a gassous fuel derived from coal. Very high combined-cycle efficiencies of 55 to 60 percent are calculated for the complete combined cycle incorporating the gas generator of this invention.

The thermodynamic analysis shows that the low-pressure compressor pressure ratio must be low and about 1.8 to 3.2 to prevent excessive combined cycle degradation when the gas generator of this invention furnishes hot gas under pressure to a reheat combustor and then to a power turbine.

The gas generator and complete reheat gas turbine of this invention can be applied to generator electric power or produce mechanical power to drive a large ship where efficiency and space are important factors to be considered. The quick change-out feature of the gas generator makes such applications attractive.

According to the teachings of this invention, the particular existing aero-derivative gas generators cited and the increase in "core" flow made possible by the intercooling and supercharging effect, the reheat gas turbines of this invention can have an air-flow rate ranging from 50 lb/sec to as high as 400 lb/sec. However, the air flow rate and resulting output can be higher and extend upwards to 500 lb/sec or more, only limited to design bottlenecks encountered such as the size of the last-stage blade of the power turbine and the cooling thereof.

The air-flow rates given above will produce a reheat gas turbine output ranging from 15,000 KW to 150,000 KW for existing aero gas generators cited when adapted for intercooling and supercharging. Future units could yield even greater power output. The larger sizes of 100,000 to 200,000 KW are the desireable sizes for future electric utility installations as the present plans are to increase existing plant output by increments of 100,000 to 200,000 KW and not going to the larger single units of the past decades of 1,000 MW size. It should be remembered that the reheat gas turbine arrangements of this invention will produce about one-third more secondary power from the steam or vapor bottoming portion of the cycle to supplement existing electric-utility power plant output.

While the invention has been described in connection with specific embodiments thereof, it will be understood that it is capable of further modifications, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An open cycle axial flow turbo hot gas generator assembly of modular construction for generating a hot gas at a bakc pressure above atmospheric with essentially an axial movement of the working fluid past any row of moving blades comprising:
   a. A cylindrically shaped sectionalized outer casing to retain and direct the flow of said working fluid and to provide structural integrity of said gas generator assembly,
   b. An air intake at one end of said casing,
   c. A low pressure axial flow compressor mounted in said casing, connected directly to said intake to receive air therethrough and having a plurality of rows of moving blades whereof there is given flow pitchline radius of $r_2$ and wherein the torque transmitted to overhung rotating parts of said low pressure compressor and the rotating forces thereof are carried by a single axle style bearing and stub shaft arrangement.
   d. A low pressure compressor discharge air housing connected to said casing and forming part of said casing with at least one radial discharge flange for discharging said low pressure compressor heated air to an external intercooling means,
   e. A low pressure return air housing removably connected and fitted to said low pressure discharge housing forming part of said casing with at least one radial return air flange for receiving cooled air from said external intercooling means,
   f. A high pressure axial flow hollow compressor mounted in said casing, connected directly to said return air housing having a plurality of rows of moving blades and variable stator blades whereof there is a given flow pitchline radius $r_3$ wherein said flow pitchline radius $r_2$ of said low pressure compressor is substantially greater than that of said radius $r_3$ of said high pressure compressor and wherein the RPM of said high pressure compressor is substantially greater than that of said low pressure compressor,
   g. Combustion apparatus mounted in said casing and connected directly to said high pressure compressor to receive the air compressed by said high pressure compressor and wherein the temperature of said working fluid is elevated by burning a fuel therein,
   h. An axial flow high pressure turbine having an open hub with at least one stage mounted in said casing and connected to said combustion apparatus therefrom and drivingly connected to said high pressure compressor by means of a hollow shaft passing axially through said combustion apparatus, the power developed being substantially wholly absorbed by said high pressure compressor,
   i. An axial flow low pressure turbine with at least one stage mounted in said casing connected directly to said high pressure turbine to receive the exhaust therefrom and drivingly connected directly to said low pressure compressor by means of a short compressor stub shaft and thereto a second driving shaft passing coaxially through said high pressure turbine open hub, said high pressure hollow shaft and said high pressure hollow compressor, the power developed by said low pressure turbine being substantially wholly absorbed by said low pressure compressor,
   j. An axial flow annular discharge duct and flange mounted in said casing connected directly to said low pressure turbine to receive the exhaust therefrom and to provide means for connecting thereto the hot gas generated: in which said low pressure compressor of said hot gas generator contains multiple stages to accomplish a compression ratio no greater than about 3.2 with said single bearing overhung design and in which said high pressure compressor of said hot gas generator contains multiple stages to accomplish an overall compression ratio for both low and high pressure compressors of at least about 35 and wherein said low pressure discharge housing contains a low pressure compressor discharge axial duct and radial diffuser flaring outwardly to said radial discharge flange and wherein said low pressure return housing contains an "S" shaped low pressure reverse flow return duct tucked inside and under said low pressure discharge duct wherein adequate volumetric dimensions are provided with the radii of said $r_2$ and $r_3$ and compressor stub shaft to yield a return velocity inside and return duct of about 75 feet per second therein resulting typically in a 0.25 percent pressure loss.

2. An open cycle axial flow turbo hot gas generator assembly with two separate cases of modular construction positioned on a single centerline axis for generating a hot gas at a back pressure above atmospheric with essentially an axial movement of the working fluid past any row of moving blades comprising:
   a. A first cylindrically shaped outer casing to retain and direct the flow of said working fluid and to provide structural integrity of said casing,
   b. An air intake at one end of said first casing,
   c. A low pressure axial flow compressor mounted in said first casing, connected directly to said intake to receive air therethrough and having a plurality of rows of moving blades,
   d. A low pressure compressor discharge air housing connected to said first casing and forming part of said casing with at least one radial discharge flange for discharging said low pressure compressor heated air to an external intercooling means,
   e. A second cylindrically shaped outer casing to retain and direct the flow of said low pressure working fluid and to provide structural integrity of said second casing,
   f. A low pressure return air housing with at least one radial return air flange for receiving cooled air from said external intercooling means mounted at the end of said second casing and being juxtapositioned adjacent to said low pressure compressor discahrge housing,
   g. A high pressure axial flow hollow compressor mounted in said second casing, connected directly to said low pressure return air housing having a plurality of rows of moving blades and variable stator blades wherein the RPM of said high pressure compressor is substantially greater than that of said low pressure compressor,
   h. Combustion apparatus mounted in said second casing and connected directly to said high pressure compressor to receive the air compressed by said high pressure compressor and wherein the temperature of said working fluid is elevated by burning a fuel therein,
   i. An axial flow high pressure turbine having an open hub with at least one stage mounted in said second casing and connected to said combustion apparatus therefrom and drivingly connected to said high pressure hollow compressor by means of a hollow first shaft passing coaxially through said combustion apparatus, the power developed being substantially wholly absorbed by said high pressure compressor, j. An axial flow low pressure turbine with at least one stage mounted in said second casing connected directly to said high pressure turbine to receive the exhaust therefrom and drivingly connected directly to said low pressure compressor by means of a second shaft passing coaxially through said high pressure turbine open hub, said high pressure hollow shaft and said high pressure hollow compressor whereby a flexible coupling and spacer shaft assembly is positioned between said second shaft and said low pressure compressor, the power developed by said low pressure turbine being substantially wholly adsorbed by said low pressure compressor, k. An axial flow annular discharge duct and flange mounted in said second casing connected directly to said low pressure turbine to receive the exhaust therefrom and to provide means for connecting thereto the hot gas generated: in which said low pressure compressor of said hot gas generator contains multiple stages to accomplish a compression ratio no greater than about 3.2 and in which said high pressure compressor of said hot gas generator contains multiple stages to accomplish an overall compression ratio for both low and high pressure compressors of at least about 35.

3. A reheat gas turbine system with substantially axial flow of the high velocity working fluid from inlet to exhaust with a common, single, axial centerline for the production of power comprising in combination:

a. A pre-assembled single casing hot gas generator as defined in claim 1, b. One or more externally mounted intercooler assemblies connected to said hot gas generator by means of external inlet and exhaust piping wherein the low pressure compressor compressed air is cooled, c. An annular axial flow diffuser assembly detachably attached to said hot gas generator wherein the high velocity of the exiting gas from said gas generator is substantially reduced and the velocity pressure is substantially wholly converted to static pressure, d. A reheat combustor assembly detachably attached to said diffuser assembly whereby said reheat combustor assembly raises the temperature of the diffused hot gas by burning fuel therein, e. A power turbine assembly detachably attached to said reheat combustor assembly wherein the heated reheat gas is expanded to product power.

4. A reheat gas turbine system with substantially axial flow of the high velocity working fluid from inlet to exhaust with a common single axial centerline for the production of power comprising in combination:

a. A pres-assembled dual casing hot gas generator as defined in claim 2, b. One or more externally mounted intercooler assemblies connected to said hot gas generator by means of external inlet and exhaust piping wherein the low pressure compressor compressed air is cooled, c. An annular axial flow diffuser assembly detacbably attached to said hot gas generator wherein the high velocity of exiting gas from said gas generator is substantially reduced and the velocity pressure is substantially wholly converted to static pressure, d. A reheat combustor assembly detachably attached to said diffuser assembly whereby said reheat combustor assembly raises the temperature of the diffused hot gas by burning fuel therein, e. A power turbine assembly detachably attached to said reheat combustor assembly wherein the heated reheat gas is expanded to produce power.

5. A gas generator as defined in claim 1 wherein the low pressure compressor has four to six stages with a flow pitch line radius $r_2$ ranging between 2.2 to 3.0 times the length of the pitch line radius $r_3$ of the high pressure compressor.

6. A gas generator as defined in claim 5 wherein the low pressure compressor has a preferred pitch line radius $r_2$ 2.75 times the length of the pitch line radius $r_3$ of the high pressure compressor.

7. A gas generator as defined in claim 1 wherein the low pressue compressor discharge housing has a radial parallel straight wall vaneless diffuser and struts to tie the sidewalls of said diffuser together.

8. A gas generator as defined in claim 1 wherein the low pressure compressor overhung bearing arrangement with cantilever support struts incorporates an anti-friction steel ball type bearing.

9. A gas generator as defined in claim 1 or 2 wherein the high pressure compressor discharge air is raised to a temperature level as high as 2600° F. or higher in the combustion apparatus.

10. A gas generator as defined in claim 5 wherein said gas generator is sized for an airflow of 300 lb/sec and wherein the low pressure compressor, the low pressure turbine shaft and the low pressure turbine all rotate at about 3600 RPM.

11. A gas generator as defined in claim 1 or 2 wherein said gas generator is sized for an air flow of 300 lb/sec wherein the high pressure compressor has eleven or more axial stages and wherein the said high pressure compressor, the high pressure shaft and the high pressure turbine all rotate at about 8500 RPM.

12. A gas generator as defined in claim 1 or 2 wherein the high pressure compressor has eleven or more stages and wherein said high pressure compressor has a pressure ratio ranging from twelve to twenty-four.

13. A reheat gas turbine as defined in claim 3 or 4 of varying size wherein the low and high pressure compressors, low and high pressure turbines and combustion apparatus dimensions are varied through dynamic similarity principles to allow an airflow variation passing through said reheat gas turbine to range from 50 lb/sec upwards to 500 lb/sec.

14. A reheat gas turbine as defined in claim 13 with a power output of the power turbine ranging from 15,000 KW upwards to 200,000 KW.

15. A reheat gas turbine as defined in claim 3 or 4 wherein the power turbine is an axial flow multi stage turbine which receives reheated gas at a total pressure ranging from 4 to 9 atmospheres and expands said hot gas to essentially atmospheric pressure.

16. A reheat gas turbine as defined in claim 3 or 4 wherein the reheat assembly incorporates an annular combustor and the gas generator exit gas is reheated to a temperature ranging from 2000° F. to 2500° F. by means of said annular combustor.

17. A reheat gas turbine as defined in claim 3 or 4 wherein the intercooler means cools said low pressure compressor discharge air by heat exchange whereby the coolant is water.

18. A reheat gas turbine as defined in claim 3 or 4 wherein the intercooler means is by heat exchage and whereby the coolant is water, ammonia or a mixture thereof and whereby the cooling effectiveness of the intercooler means is as high as 95 percent and the approach temperature of the cooled low pressure compressor air to the coolant is as low as 10° F.

19. A reheat gas turbine as defined in claim 3 or 4 wherein the coolant of the intercooler means is water and wherein the intercooler means is a water spray direct contact apparatus whereby water is sprayed directly into the hot low pressure compressor discharge air to cool said hot discharge air by direct contact evaporation and humidification and whereafter the evaporated water is compressed in the high pressure compressor as an air/steam mixture.

20. A reheat gas turbine as defined in claim 3 or 4 wherein the intercooler means coolant is water and wherein the said coolant cools the hot low pressure compressor discharge air by heat exchange and whereby the coolant after being heated by the said hot low pressure air is cooled by ambient air through direct contact of the ambient air with the coolant water wherein direct contact and evaporation cools said coolant water and wherein said cooled coolant thereafter is recirculated to said intercooler means in an open cycle.

21. A reheat gas turbine as defined in claim 3 or 4 wherein the intercooler means coolant is water, ammonia or a mixture thereof and wherein the hot low pressure compressor discharge air is cooled by heat exchange and whereby the coolant after being heated by said hot low pressure air is cooled by heat exchange whereby ambient air is blow over heat exchange media wherein said cooled coolant thereafter is recirculated to said intercooler means in a closed cycle.

* * * * *